United States Patent
Hon et al.

(10) Patent No.: US 8,464,164 B2
(45) Date of Patent: Jun. 11, 2013

(54) SYSTEM AND METHOD TO CREATE A COLLABORATIVE WEB-BASED MULTIMEDIA CONTEXTUAL DIALOGUE

(75) Inventors: Henry Hon, Berkeley, CA (US); Timothy Henry Hon, Berkeley, CA (US); David Paul Rorex, Walnut Creek, CA (US); Michael Bantista, Emeryville, CA (US)

(73) Assignee: Simulat, Inc., Berkeley, CA (US)

( * ) Notice: Subject to any disclaimer, the term of this patent is extended or adjusted under 35 U.S.C. 154(b) by 750 days.

(21) Appl. No.: 12/319,807

(22) Filed: Jan. 13, 2009

(65) Prior Publication Data

US 2012/0260195 A1 Oct. 11, 2012

Related U.S. Application Data

(63) Continuation-in-part of application No. 11/657,787, filed on Jan. 24, 2007, now Pat. No. 7,933,956.

(60) Provisional application No. 60/761,529, filed on Jan. 24, 2006.

(51) Int. Cl.
*G06F 3/00* (2006.01)
*G06F 3/01* (2006.01)

(52) U.S. Cl.
USPC ........... 715/753; 715/751; 715/752; 715/758; 715/759

(58) Field of Classification Search
USPC ................. 715/735–737, 750–753, 758–759, 715/767
See application file for complete search history.

(56) References Cited

U.S. PATENT DOCUMENTS

| | | | |
|---|---|---|---|
| 7,047,279 B1 * | 5/2006 | Beams et al. | 709/204 |
| 7,124,164 B1 * | 10/2006 | Chemtob | 709/204 |
| 7,280,991 B1 * | 10/2007 | Beams et al. | 706/46 |
| 7,590,941 B2 * | 9/2009 | Wee et al. | 715/753 |
| 2002/0002562 A1 * | 1/2002 | Moran et al. | 707/500 |
| 2002/0163548 A1 * | 11/2002 | Chiu et al. | 345/864 |
| 2003/0023686 A1 * | 1/2003 | Beams et al. | 709/205 |
| 2004/0169683 A1 * | 9/2004 | Chiu et al. | 345/776 |
| 2006/0190391 A1 * | 8/2006 | Cullen et al. | 705/37 |
| 2006/0206370 A1 * | 9/2006 | Skopal | 705/9 |
| 2007/0100712 A1 * | 5/2007 | Kilpatrick et al. | 705/29 |
| 2007/0191979 A1 * | 8/2007 | Zeng et al. | 700/97 |
| 2008/0120126 A1 * | 5/2008 | Bone | 705/1 |
| 2008/0263629 A1 * | 10/2008 | Anderson | 726/2 |
| 2009/0089625 A1 * | 4/2009 | Kannappan et al. | 714/39 |
| 2010/0070970 A1 * | 3/2010 | Hu et al. | 718/1 |
| 2010/0138756 A1 * | 6/2010 | Saund et al. | 715/758 |

* cited by examiner

*Primary Examiner* — Nicholas Augustine
(74) *Attorney, Agent, or Firm* — Joseph R. Carvalko, Jr.

(57) ABSTRACT

The present invention relates a method and system for collaborating in a shared network space comprising logging in from the one or more user machines to the shared space in a network from a user application to a host, wherein the shared space is created by interaction of executable codes in the host and the user application and the shared space is described by a session attribute list; loading a media application with tools into a one or more user machines; inputting graphical content; and displaying the content by other user machines in the shared space synchronously or asynchronously including anchoring a sidebar panel to a region of a browser; creating one or more user messages in the sidebar panel; displaying graphical content on a whiteboard; highlighting points of interest within the graphical content; and associating said user messages to the points of interest by one or more lines.

19 Claims, 16 Drawing Sheets

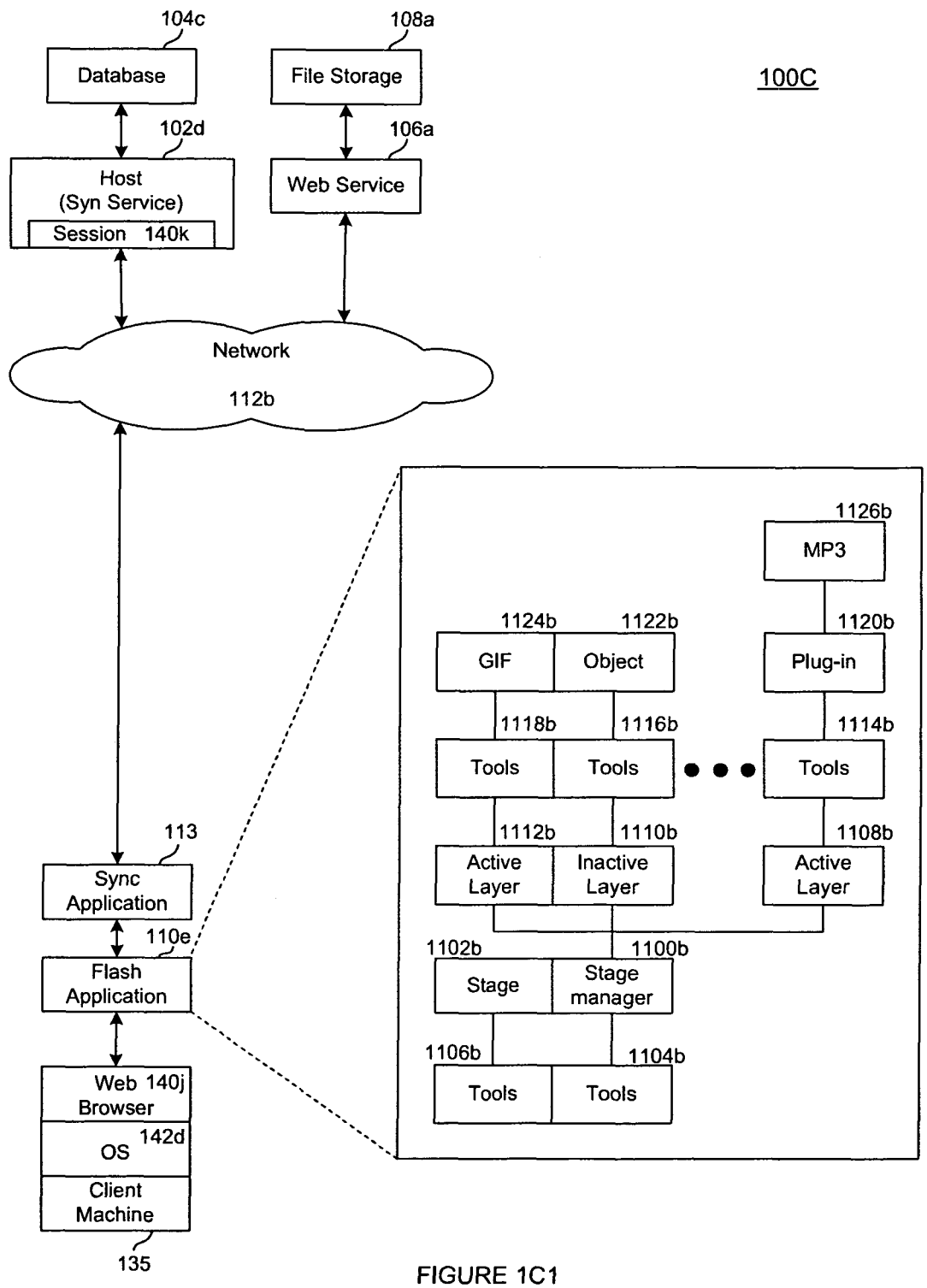
FIGURE 1C1

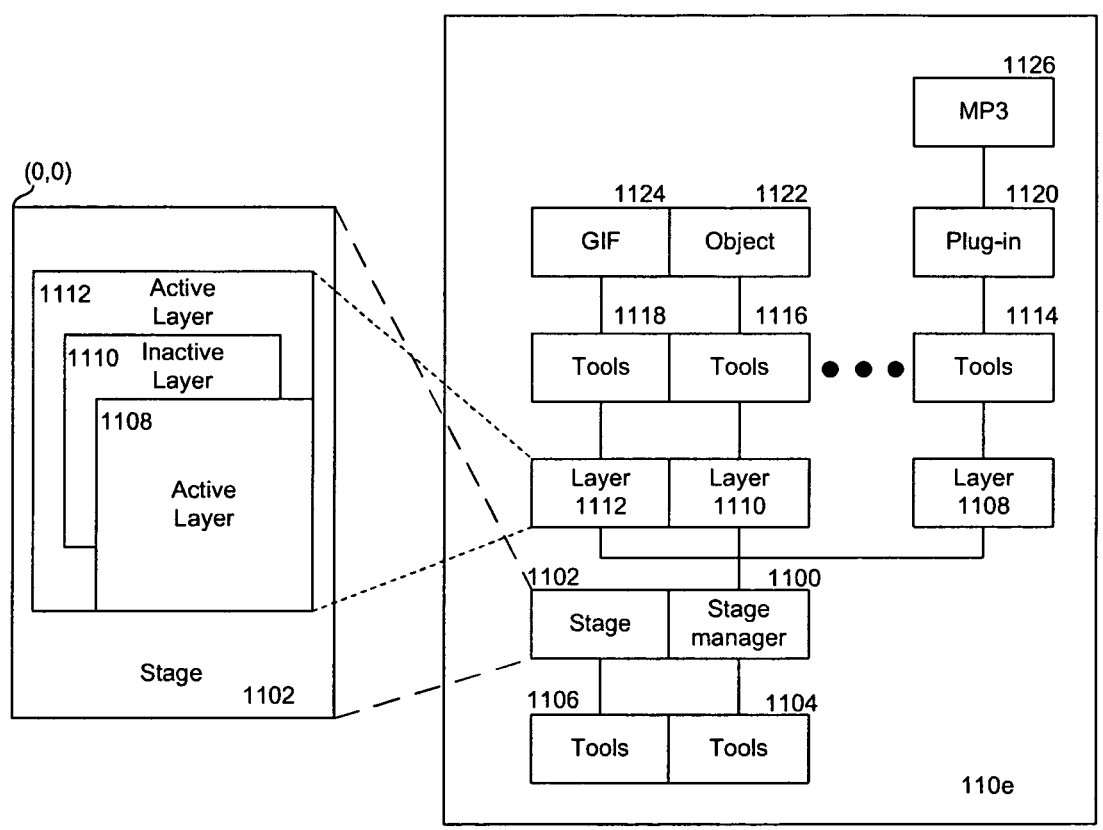
FIGURE 1C2

SYSTEM AND METHOD TO CREATE A COLLABORATIVE WEB-BASED MULTIMEDIA CONTEXTUAL DIALOGUE

CROSS-REFERENCE TO RELATED APPLICATIONS

This is a continuation-in-part of and claims the priority benefit under 35 U.S.C. 120 of U.S. patent application Ser. No. 11/657,787 entitled A System and Method to Create a Collaborative Web-based Multimedia Layered Platform, filed Jan. 24, 2007 now U.S. Pat. No. 9,933,956, and additionally claims the benefit under 35 U.S.C. 119 (e) of U.S. Provisional Application No. 60/761,529, A System And Method To Create A Collaborative Web-Based Multimedia Layered Platform, filed on Jan. 24, 2006, each of the entire disclosures of which are hereby incorporated by reference herein.

FIELD OF THE INVENTION

This invention generally relates to the field of asynchronous and synchronous web conferencing methods and systems.

BACKGROUND OF THE INVENTION

In the last few years, there has been an explosion in new forms of web based communication within a shared space. The synchronous form is most commonly practiced as Online Chat. With synchronous communication, like Online Chat for example, text is exchanged in real-time between participants. Although images can be provided to a limited extent, links to images or other multimedia is more commonly used. Another common form of synchronous communication is with web conferencing services. These services provide a discrete state synchronicity such that only one image can be shared at one time. Typically, once the session has ended, the images shared are lost. Many of the current online collaboration systems are beginning to record the sessions. However, these recording are only recoding a series of images for play back.

The most common asynchronous forms of collaboration are Forums, blogs and WIKIs. In the asynchronous case, visitors can upload text or images so that all subsequent visitors can browse and see the text or images. Blogs and Forums have an advantage over Chat in that conversations can be linked into 'threads'. This allows the user to follow a set of contributions in a linear and/or nested fashion. Lacking is the real-time aspect as well as the ability to layer media. Currently even if you can upload an image or multimedia clip into a chat room or blog, it is not known for visitors to alter, manipulate or annotate over the original posting. What is common to these forms of shared communication is that they are linear. All information whether text or image, is accessed in order. A comment in a blog about an image does not appear on top of the image, but instead next to it as with 'threads'. The same holds true for a chat box. Users must cut and paste to refer to a past event.

Lacking is a system that will allow both synchronous and asynchronous communication using discrete media layers such that information can be organized by time and space which in turn can allow for a variety of organizational metaphors.

It will be desirable that multiple users are able to interact with one another and perform a plurality of multimedia tasks in a virtual and synchronized shared environment; or to be able to access and review the performed tasks from local or remote sources at will in any order. It will also be desirable to allow users to set control or restrict the viewing of media layers in the same shared environment through different filtering algorithms. It is also desirable that an original image can seemed to be altered or manipulated by overlaying various media-layers together.

The following terminologies used in the application are selectively defined by an online dictionary such as Wikipedia to help understanding:

Web based shared space—This describes a single point of reference for multiple users to access and add and modify information from a web browser for viewing by others via that same point of reference.

Media (multi)—Multimedia is the use of several different media to convey information (text, audio, graphics, animation, video, and interactivity).

Medium—defined as the singular of multimedia. For example, text, a media, is a singular example of multimedia.

API—An application programming interface (API) is the interface that a computer system or application provides in order to allow requests for service to be made of it by other computer programs, and/or to allow data to be exchanged between them.

Plug-in—A plug-in is a computer program that can, or must, interact with another program to provide a certain, usually very specific, function. Typical examples are plug-in to display specific graphic formats (e.g., SVG if the browser doesn't support this format natively), to play multimedia files, to encrypt/decrypt email (e.g., PGP), or to filter images in graphic programs. The main program (a web browser or an email client, for example) provides a way for plug-in to register themselves with the program, and a protocol by which data is exchanged with plug-in. Plug-ins are slightly different from extensions, which modify or add to existing functionality. The main difference is that plug-in generally run within a sandbox, rely on the main program's user interface, and have a well-defined boundary to their possible set of actions.

Media-layer (media layer) (layer)—A media-layer is defined as a container that supports the display and modification of media and plug-ins. Media-layers have meta information, or attributes, such as; author, time/date created, its parent media-container, a list of children media-containers, position within 3D space, stacking order relative to the parent media-layer, size, reference to media or a plug-in that is assigned to the media-layer, etc.

Images—defined as photographs, drawings (vector and raster), diagrams, etc.

Annotation—Extra information associated with a particular point in a document or other piece of information.

Common Web Browser—A web browser is a software application, technically a type of HTTP client, that enables a user to display and interact with HTML documents hosted by web servers or held in a file system. Popular browsers available for personal computers include Microsoft Internet Explorer.®., Mozilla Firefox.®., Opera.°0., Netscape.®., Apple Safar.®.i and Konqueror.®.. A browser is the most commonly used kind of user agent. The largest networked collection of linked documents is known as the World Wide Web. It is assumed that all common web browser will have Macromedia Flash.®. installed or will support the installation and proper execution of Flash.®. applications.

Account Owner (creator)—The person who owns, creates or maintains or provided stewardship over a particular session and all options, rights relevant to that session.

Space Creator—The User creates an account to which a 'space' is allocated where other individuals also using a browser can engage in the synchronized or unsynchronized viewing and annotating of images.

Blog—A blog is a website in which journal entries are posted on a regular basis and displayed in reverse chronological order. The term blog is a shortened form of web log or web log. Authoring a blog, maintaining a blog or adding an article to an existing blog is called "blogging". Individual articles on a blog are called "blog posts," "posts" or "entries". A person who posts these entries is called a "blogger". A blog comprises hypertext, images, and links (to other WebPages and to video, audio and other files). Blogs use a conversational documentation style. Often blogs focus on a particular "area of interest", such as Washington, D.C.'s political goings-on. Some blogs discuss personal experiences.

Threads—Threads in a forum are either flat (posts are listed in chronological order) or threaded (each post is made in reply to a parent post). Sometimes, community members have a choice on how to display threads.

Online Chat—Online chat can refer to any kind of communication over the internet, but is primarily meant to refer to direct 1 on 1 chat or chat rooms, using tools such as instant messenger applications-computer programs, Internet Relay Chat, talkers and possibly MUDs, MUCKs, MUSHes and MOOes.

Room—A Room is a common reference to a 'shared space'. A room contains default tools, rules and permissions that are set and controlled by the room administrator.

Space—A shared virtual reference point where as multiple users can interact in real-time upon shared objects.

Stage—A reference coordinate system that informs where media should be displayed. The most typical stage is a two dimensional Cartesian coordinate system where 0,0 is position in the upper right of the display area.

Session State—The state of all objects, GUI tools and controls, and media-layers, at any given time.

Collection—One or more media-layers that have an organizational structure. Typically this is stored as an XML file.

Tools—GUI applications that affect the state of other tools and media-layers.

Tool: scene manager—specific GUI applications that affect the overall display of the stage.

Event—A set of codes that describe the modification of a media-layer.

WIKI—A website that allows the visitors themselves to easily add, remove, and otherwise edit and change available content, and typically without the need for registration.

Network—A computer network is two or more computers connected together using a telecommunication system for the purpose of communicating and sharing resources. Examples include but are not limited to a WAN or LAN connection or an internet, intranet or extranet connection A sidebar is a panel within a browser such as Windows® desktop (Windows is a registered trademark of Microsoft Corporation). Sidebars often perform various tasks, such as displaying the time and date and showing the CPU usage.

A whiteboard is a drawing utility, commonly supplied as part of a collaboration framework to allow distributed users to share a common drawing space.

SUMMARY OF THE INVENTION

The present invention relates to the field of collaborative computing, and more particularly, to a method to collaborate, interact with and perform multimedia tasks in a shared space within a network including the steps of: logging in from one or more user machines to a shared space in a network from a user application to a host, wherein the shared space is created by interaction of executable codes in the host and the user application and the shared space is described by a session attribute list; loading a media application with a plurality of tools into one or more user machines; inputting graphical content; and displaying the graphical content by other user machines in the shared space in one of synchronous or asynchronous mode including user message exchange including anchoring a sidebar panel to a region of a browser; creating one or more messages in the sidebar panel; displaying graphical content on a whiteboard within a browser; highlighting points of interest within the graphical content; and associating said user messages to the points of interest by one or more lines.

The invention further relates to a method of filtering one or more messages according to one of author of the message, message content, date or time. In one embodiment filtering allows users within the shared space to filter user inputs such as media-layers, user comments, notes, and drawings. In yet another embodiment filtering by a user would temporarily hide all other media-layer content except for the selected user or filtering a selected date range.

The invention further relates to a method of producing a write up on a log or a page illustrating a summary of all inputs into the user space.

The invention further relates to a method for tracking of all user inputs for the purpose of producing the log of all logins, inputs and interactions by all users within the shared space.

The invention further relates to a method of moving highlighted of points of interest within the graphical content in accordance with the intentions of a user.

The invention further relates to a system to collaborate, interact with and perform multimedia task inputs in a shared space within a network including: a host server for communicating with a database and a file storage through a network; one or more user machines with associated user applications for logging onto the host server to join a shared space session with other user machines running user applications, wherein the shared space session is generated by interaction of executable codes in the host and the user applications and the shared space session is described by a session attribute list; a media application with a plurality of tools loaded into the user machines; at least one user provided graphical content installed into the media-layers; and a stage manager to facilitate the display of media-layer updates to other users in the shared space in on of synchronous or asynchronous mode that includes a message exchange including one or more user messages contained in a sidebar panel anchored to a region of a browser of a user machine, whereby at least a portion of the message relates to graphical content displayed on a whiteboard within a browser, and whereby points of interest within the graphical content are highlighted and associated to said message by one or more lines.

The invention further relates to a means for moving highlighted of points of interest within the graphical content in accordance with the intentions of a user of the system.

The invention further relates to one or more message threads based upon a message existing in the sidebar.

The invention further relates to a graphic depicting digital content presented in the form of one of a document, waveform, or multidimensional graphic.

BRIEF DESCRIPTION OF THE DRAWINGS

FIG. 1C1 is an embodiment of a system illustrating the process of establishing and operating a session within a user application such as a web browser using various tools in an application in accordance with an embodiment of the invention.

FIG. 1C2 illustrates another embodiment of various components of a Flash application tools interacting with the user's media-layers during a session in accordance with an embodiment of the invention.

DETAILED DESCRIPTION OF THE PREFERRED EMBODIMENTS

Figure 1A:
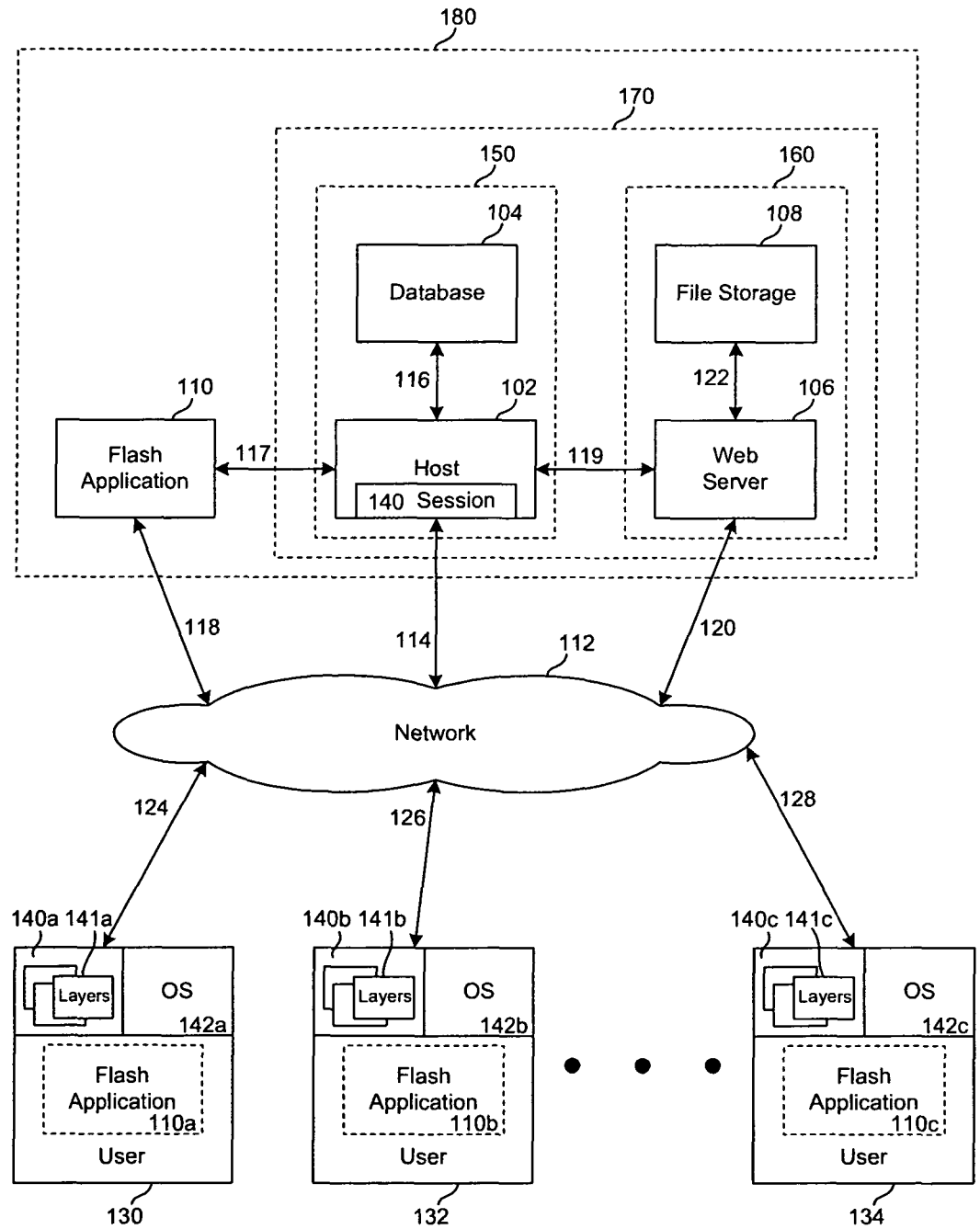
FIG. 1A depicts the embodiments of a system to create a session in shared spaces for the collaborative web-based media-layered platform in a network environment in accordance with an embodiment of the invention.

The following description includes the best mode of carrying out the invention. The detailed description is made for the purpose of illustrating the general principles of the invention and should not be taken in a limiting sense. The scope of the invention is determined by reference to the claims. Each part is assigned, even if structurally identical to another part, a unique reference number wherever that part is shown in the drawing figures.

The present invention, relates to the field of collaborative computing, and more particularly, to a system and method for providing a browser-based program to create, and configure a shared space whereby multiple users can access this shared space to perform tasks and interact such as input, modify text and delete images, drawings and other multimedia via media-layers in a real-time synchronous manner. A shared space is defined as a virtual reference point whereas multiple users can interact in real-time upon shared objects. It is a conceptual construct created by processing executable machine codes from a plurality of programs or plug-ins typically using Flash Virtual Machine (VM) or Java VM. A session is defined as the state of all objects, GUI tools and controls, and media-layers, at any given time within the shared space. Each media-layer can serve as a container for shapes and objects as well as other programs such as a text editor, thumbnail viewer, MP3 player, games, etc. The invention also allows which media-layer(s) to display via organization metaphors and filtering criteria. The invention also allows for offline or unsynchronized interaction with objects of a session. Offline events are recorded for later integration with the session.

FIG. 1A of the present invention relates to a distributed web based conferencing system, apparatus and method, which includes at least one central processing computer or computer network server. FIG. 1A depicts the basic foundation of the invention of system 100A to create a session 140 in shared spaces 140a to 140c for multiple users to collaborate on a web-based platform with created media-layers 141a to 141c within a network 112 environment. The system 100A is derived from four main components. Client or user machine(s) 130 to 134, host server 170, database 104 storage device, file storage 108 which is accessible through a web server 106. Each component may be on the same machine or separate machines. It is not necessary that each machine is of the same OS, nor CPU, type. Servers 150, 160 include at least one controller (not shown) or central processing unit (CPU or processor), at least one communication port or hub, at least one random access memory (RAM), at least one read-only memory (ROM) and one or more databases such as database 104 or data storage devices 108. All of these later elements are in communication with respective CPUs to facilitate the operation of the host server 170. The server 170 may be configured in many different ways. For example, host server may be a conventional standalone server computer or alternatively, the function of server may be distributed across multiple computing systems and architectures.

Server 170 also may be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers such as web server 106, or user computers (e.g., 130, 132, 134) and other related devices. The communications hub or port may have minimal processing capability itself, serving primarily as a communications router establishing a corresponding link 119 with the web server 106. A variety of communications protocols may be part of the system, including but not limited to: Ethernet, SAP, SAS.™., ATP, Bluetooth, GSM and TCP/IP.

Data storage devices such as file storage 108 may include a hard magnetic disk drive, optical storage units, CD-ROM drives, or flash memory. Data storage devices contain databases such as database 104 used in processing transactions and/or calculations in accordance with the present invention, including at least a user subscriber database and a user content database. In one embodiment, database software creates and manages these databases. Conference related calculations and/or algorithms of the present invention are stored in storage device and executed by the corresponding CPU.

The controller comprises a processor, such as one or more conventional microprocessors and one or more supplementary co-processors such as math co-processors. The processor is in communication with a communication port through which the processor communicates with other devices such as other servers, user terminals or devices. The communication port may include multiple communication channels for simultaneous communication with, for example, other processors, servers or client terminals. As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor also is in communication with a data storage device. The data storage device may comprise an appropriate combination of magnetic, optical and/or semiconductor memory, and may include, for example, RAM, ROM, flash drive, an optical disc such as a compact disc and/or a hard disk or drive. The processor and the data storage device each may be, for example, located entirely within a single computer or other computing device; or connected to each other by a communication medium, such as a USB port, serial port cable, a coaxial cable, a Ethernet type cable, a telephone line, a radio frequency transceiver or other similar wireless or wired medium or combination of the foregoing.

The data storage device may store, for example, (i) a program (e.g., computer program code and/or a computer program product) adapted to direct the processor in accordance with the present invention, and particularly in accordance with the processes described in detail hereinafter; (ii) a database adapted to store information that may be utilized to store information required by the program. The database includes multiple records, each record including fields specific to the present invention such as membership rates, subscribers, sessions, etc.

The program may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as alternative steps of invention. The computer program code required to implement the above functions (and the other functions described herein) can be developed by a person of ordinary skill in the art, and is not described in detail herein.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Server 170 of the present invention may also interact and/or control one or more user devices or terminals (e.g., 130, 132, 134). The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc.).

The shared spaces 140a to 140c emulate and share the contents of the session 140 where executable machine codes in both the client or user machines 130 to 134 and the host 102. The executable codes in each machine may be different, but the intended results of the invention are achieved. The state of the session 140 is maintained on the host 102 during a live session 140 then the database 104 at the end of a session. All client or user machines 130 to 134 that are logged into a session 140 are constantly updated with changes to the session 140 in real time. If permissions are granted, any client can initiate a change to the state of the live session. Once this change has been sent, all client machines 130 to 134 are updated with the change.

The system 100A comprises of a host 102 in synchronous communication with one or more user machines 130 to 134. In an embodiment, the host is a server in communication with a database 104; where the host is also in communication with a web server 106 that communicates with a file storage 108. The database 104 can be in a separate server, or can be part of the host 102 within the same server 150. Similarly, the web server 106 and the file storage 108 can be separate units or can be integrated into a server 160. Yet in another embodiment, a host 170 is a server including the functions of the database 104, the web server 106 and the file storage 108. The physical location of the database 104, file storage 108 and the method of writing the machine executable codes being integrated into the host server 102 is not important to the invention as long as the functions are accessible to the host 102 and to the user machines 130 to 134.

In an embodiment, each of the user machines 130 to 134 has an operating system 142a to 142c such as the Microsoft Windows XP.®., Linux.®., Macintosh OSX.®. or any third party operating system. The operating system in each of the user machines 130 to 134 need not be the same as long as it supports a web browser or other application to access the internet and supports the execution of codes to facilitate the intended media functions of the invention. In another embodiment, compiled Flash VM executable codes of the application 110 are downloaded before the creation of a shared space 140a to 140c to each of the user machines 130 to 134 from the host session 140 through the network 112 and links 124 to 128. Yet in another embodiment, the application 110 can be native to each of the user machines 130 to 134 as media applications 110a to 110c.

One or more media layers 141a to 141c are created and respective media tools are from media applications 110a to 110c is generated by the interaction of the codes in the user machines 130 to 134 and the codes from the host server 180. The network 112 and the corresponding links 114, 118, 120 to 128 are part of the Wide Area Networks (WAN), Local Area Network (LAN) through Ethernet connections or wireless connections. Yet in other embodiments, the network and the links can be Local Optical Networks (LON) or direct fiber optic links or direct terminal connections or plain old telephone service (POTS). In all forms of link communications within the network 112, the communications can be enhanced with known encryption protocols to improve security.

All services as contained within the host server 180 are equipment selected from the list to include a server, work station, personal computer, laptop computer, Personal Digital Assistant (PDA), an Intelligent Electronic Device (IED) or any suitable computing platform with sufficient memory and processing power to perform the functions as a server in a network environment. The user machines 130 to 134 are equipment selected from the list to include a server, work station, terminal, personal computer, lap top computer, Personal Digital Assistant (PDA), electronic tablet, handheld wireless device, a cellular phone, an Intelligent Electronic Device (IED) or any suitable computing platform with sufficient memory and processing power to perform the functions as a user machine to perform media inputs in a network environment.

Yet in others embodiments, the system 100A can be extended to include broad applications such as web conferencing, local conference presentations projecting synchronized annotations or pointing tool to contents on multiple screens to mass audience, on line interactive courses and tutoring, live interactive interviews to multiple interviewees in different geographical locations, interactive debate forums using multimedia, interactive cellular phone chats and games, secured synchronized interactive voting method combined with secured voter identification, live military battlefield operational command, remote interactive clinical instructions and operation training procedure; and electric power utility interactive service, support and trouble shooting etc. Said examples and the contents desired for the execution of said example can be assembled before and during synchronized events. Content can also be made available in an unsynchronized fashion such that independent content review or read only publishing can be supported.

Figure 1B:
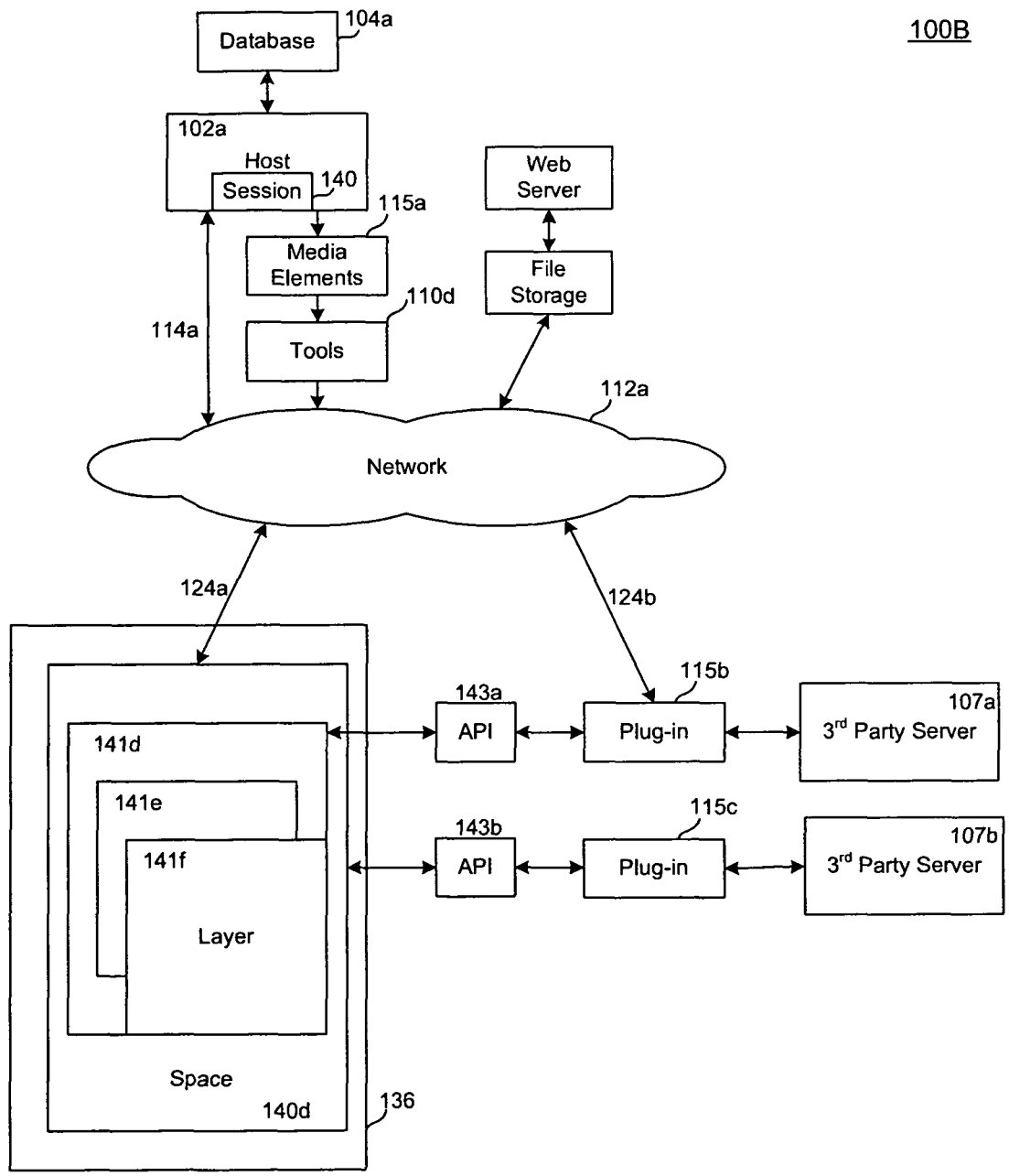
FIG. 1B illustrates the system initiation to create a session of collaboration in media-layers in accordance with an embodiment of the invention.

FIG. 1B illustrates the system 100B initiation to create a session 140 of collaboration in media-layered 141d to 141f within space 140d that holds media elements 115a, tools 110d (Flash application tools) or plug-ins 115b and 115c. Plug-ins 115b and 115c are independent applications that must conform to the system's API 143a, 143b as well as be compatible with the system's runtime environment. For example, if the client system is a macromedia Flash application, then the plug-in 115b and 115c must also be a Flash application. Said plug-ins 115b and 115c can be accessible either locally from the client machine 136, or through a local connection, or a network 112a. A plug-in 115b or 115c can, however, manage the execution of the tools of an application not of the same executable code base as the client application. For example, a Flash plug-in 115b or 115c can manage the execution of the Java application as relevant to the client machine 136.

In an embodiment, the initialization of the system 100B (in the synchronized state) requires that the user's or client's machine 136 has internet access through link 124a to network 112a and the ability to support compiled Flash based applications. A typical configuration will involve the use of a common web browser with a flash plug-in and JavaScript enabled. Through the use of a URL, the user or client makes a request to join a session 140 by sending login credentials to the host 102a. The host 102a in turn will query the database 104a to determine the tools 110d that must be downloaded and the current session 140 state parameters. In addition, plug-ins 115b and 115c are sometimes downloaded from third party servers 107a and 107b. Instruction and location of said plug-ins 115b and 115c are provided by the host 102a.

The host 102a first sends a base application that provides a synchronizing connection between that user 136 and the host 102a. A standard socket connection is established. Should this fail, High Ports are tested for the ability to exchange data. Should this fail, ports 80 and 81 are checked via standard HTTP protocols. Once a connection by links 114a and 124a from the user 136 to the host 102a has been established, the host 102a will send a list of required application tools 110d to be loaded by the user machine 136. By only loading those tools 110d that are required, the system in the user's machine 136 will start faster with a lower memory requirement. Should the user choose to run in 'thin' mode, those tools 110d that are only needed on demand will be loaded into memory during their use and unloaded after their use is no longer required.

FIG. 1C1 is an embodiment of a system 100C illustrating the process of establishing and operating a session within a user application such as a web browser 140j using various tools in Flash application 110e. When a user 135 logs onto the system 100C via the internet, LAN or WAN 112b, the user 135 is registered in a shared virtual environment (session 140k) based on user's credentials and other parameters supplied at log on. In this exemplary example, the flash application 110e is loaded on to the client's machine 135 by the client's web browser 140j. This flash application 110e in turn, loads a communication synchronizer application 113 that contacts the Host's server synchronization service 102d and requests to be registered with a particular shared space for a session. Once this connection has been established, all communication between the client application 110e and the host sync service 102d happen between these two applications.

Based on user credentials and other parameters supplied, a list of tools and their location(s) on the file storage server(s) 108a is generated. This list is passed to the flash application 110e. The flash application 110e then loads a stage manager tool 1100b into the buffer memory from the web server 106a. This tool 1100b creates and manages the stage 1102b. Once this is done, the flash application 110e then sends a message back to the file storage server 108a via sync application 113.

One of the tools that are loaded is the stage manager 1100b. This tool 1100b, once loaded, looks at the attribute list of the current room for the session. One item on that list is the type of layout to be used on the stage. If any other layout is defined besides 'default', additional tools 1104*b* are downloaded to support the additional features. The stage manager 1100*b* is then provided a list of media-layers 1108*b* to 1112*b*. Those media-layers that are listed as 'active' should be currently displayed. Active media-layers 1108*b* and 1112*b* are accessed, loaded and displayed on the stage 1102*b*. Once complete, non-active media-layer(s) 1110*b* are downloaded and stored in cache memory in a prescribed order if this option was selected. All of the media-layers together, both loaded and unloaded, 1108*b* to 1112*b* are called a 'collection'.

The relationship of all media-layers 1108*b* to 1112*b* to each other can be stored in an XML file known as the 'collection'. The most exemplary example is the default stage manager system where all media-layers are displayed using the Cartesian coordinate system where the y axis is inverted. An example XML collection file follows: TABLE-US-00001 . . . <collection type='book_simple' label='my book' authorID='23jkl4johnsmith' . . . > <tools> <page_navigator pluginRef="../plugins/book_nav.swf"/> <page_thumbnail_viewer pluginRef="../plugins/thumb_view.swf"/> . . . <tools/> <layer ID='a' label='title page' parent='top' z=0 . . . > <children 0='b'/> . . . <layer/> <layer ID='b' label='title page' parent='a' z=1 . . . > <. . . . . .

The stage manager tool 1100*b* then checks to see what type of collection has been loaded. In this case, it is a 'book_simple' type collection. The tools 1104*b* required for this type of layout is listed in the 'tools' section of the XML. The client flash application 110*e* then downloads into memory those tools 1104*b* listed.

FIG. 1C2 illustrates another embodiment of various components of the Flash application 110*e* interacting with the user's media-layers 1108 to 1112 on the stage 140*f*. Although there are a number of possible combinations of tools that can be loaded, the one tool that is always loaded is the stage manager 1100. The stage manager tool 1100, among other things, established the coordinate system and layout format that will be populated by media-layers 1108 to 1112. The most typical configuration of the stage 1102 is a two dimensional cardinal system where 0,0 is located on the upper left most side of the application window placed just under the displays for session and user information and controls. These controls are typically displayed at the top of the application window. The list of active media-layers 1108, 1112 are passed to the stage manager 1100. The media-layers 1108 and 1112 that are tagged as 'visible' are loaded first and then displayed in a stage 1102.

A media-layer is a container that serves as a reference point for media as well as other media-layers. Since media-layers 1108,1110 can be attached to another media-layer 1112, nesting of media-layers can occur. For example, a 'parent' media-layer 1112 contains an image of a human face on it. A 'child' media-layer 1110 is nested on top with a mustache drawn over the face, and another 'child' media-layer 1108 is nested on top with eye glasses drawn. When the parent media-layer's 1112 object is moved or hidden, the two child media-layer's 1110 1108 objects will also move or be hidden, thus maintaining their visual relationship. Each child however can have its visibility setting changed by a parent or another media-layer in the patriarchy. A media-layer from outside the patriarchy cannot modify a media-layer unless such functionality is support by the system's API.

The issue of concurrent users in making an annotation to the media layer is addressed next. Unique to this invention is that ability to share in real-time, near real-time as well as maintaining persistence, the ability to create, modify and delete media-layers and the media elements associated with those media-layers and regulate access to those media-layers.

In addition, all tools and User Interface (UI) elements can be controlled at runtime based on commands from the stage manager. As such, not all users logged into a shared space will see that same thing if such modifications are selected. For example, the administrator of the shared space may wish to have all the tools made available to him or her. However, all other users who are of type 'guest' will not see any tools. Those users who are of type='invited' may see only a subset of tools that the administrator sees.

When a user is logged into the system, actions that are performed on the media or changes to the media-layer's attributes are tracked and sent to the server. The server maintains a log of the actions and the resulting status of media-layers and their media. The server then repeats the actions to all users who are logged into the same session. When users enter in to a session, they immediately load all active media-layers, media and plug-ins. In this way, every user who is logged into the system has a copy of the media elements and only has to execute the actions that were sent by the server. Since all users can (if allowed by the administrator) have their action communicated back to the server, everyone's actions within the space is reflected on the display of all concurrent users. If the administer allows more then one user access to a media-layer, then only one action may occur at one time within a media-layer. In other words, if a user initiates an action, no other actions can take place until the first action is complete. Concurrent actions can occur on separate media-layers. The administrator can selected that all actions on media-layers are NOT locked. This means that if two users click on the same media-layers media, then whomever's event is sent last, will have said event respected unless the object is deleted or somehow unable to execute the later event.

A whiteboard tools perform the unique function of creating a new media-layer every time a line is started and then stopped. Each line and/or shape in the whiteboard tool library is treated like an individual object on its own media-layer.

For whatever metaphor employed, the information required to create and support an ordering construct is managed by the stage manager. All rights to what media-layers and tools are loaded, seen and how they function is controlled by the user or administrator who created the space (account). The administrator can pass the rights of a media-layers and tools to anyone(s) or to everyone.

Figure 1G:
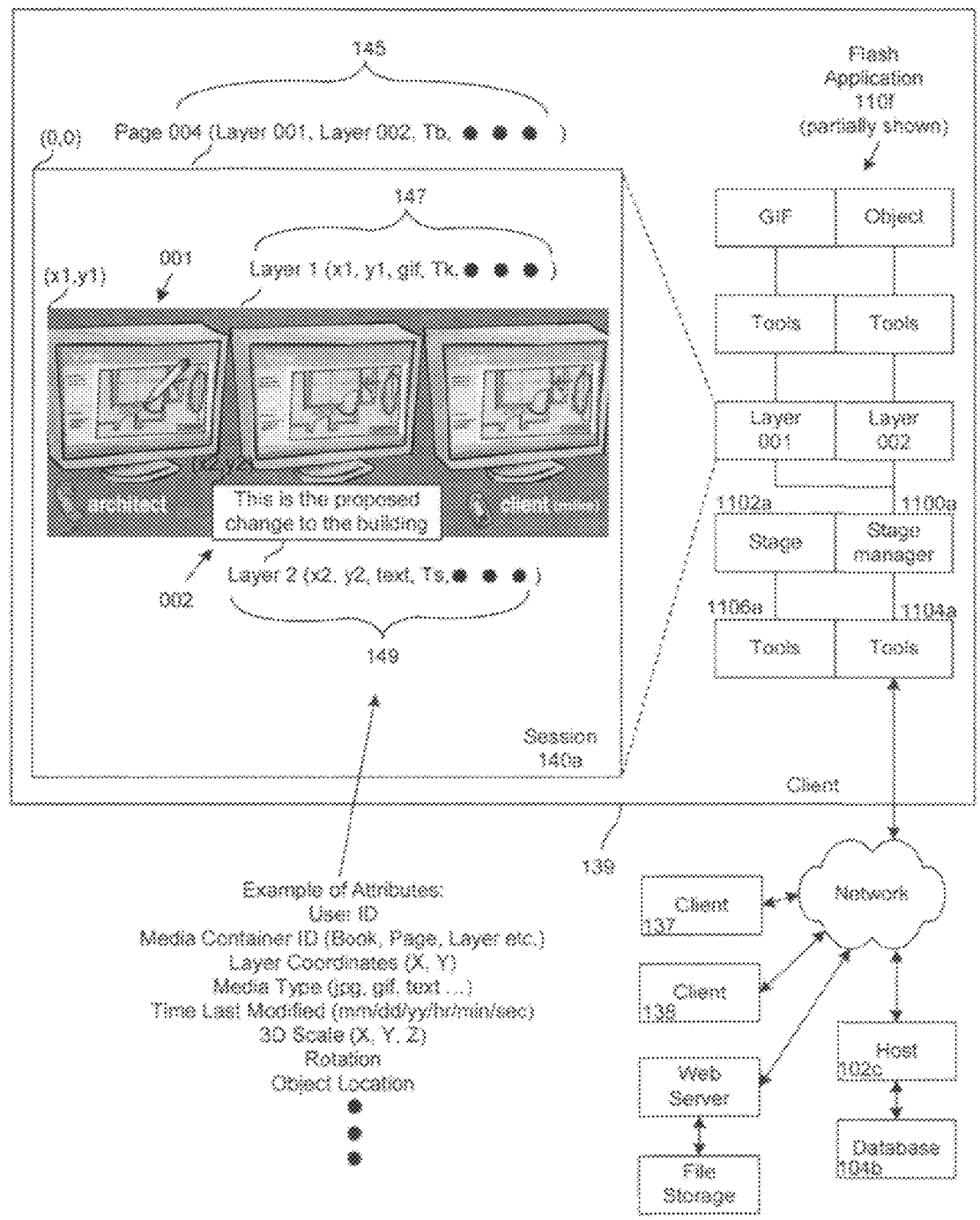
FIG. 1G illustrates an example of staging and synchronizing media-layers using a Flash application tool for the construct of a page as a collection of media-layers in accordance with an embodiment of the invention.

FIG. 1G illustrates an example of staging and synchronizing media layers using a Flash application tool for the construct of a page 004 as a collection of media-layers 001 and 002. Each media-layer 001 or 002 has attached to it, a set of corresponding attributes 147 or 149 that inform the stage manager 1100*a* also shown as 1100*b* in FIG. 1C1 on how to manage a respective media-layer. For example, media-layers with the media-layer ID 001 and 002 respectively have been placed on the stage 1102*a* of a Flash application 110*f* to be displayed. Media-layer 001 may have the following attributes: Layer ID (001), Position X1 (30), Position Y1 (30), Position Z (0), Scale in X (100), Scale in Y (100), Scale in Z (100), Rotation (0), location of media object (..//arch_exmpl.jpg), type of media object (image), Date Created (some date), Date last modified (some date), Date deleted (some date), ID of the user that created this layer (jones43), etc. From this information, the stage manager will know to load a jpg image from a given location and display that image, unaltered 30 units to the right and 30 units down. Media-layer 002 may have the similar attributes with Position X as (40), Position Y (40) and Position Z (1). In this case, the text field would appear within the application with the image in media-layer 001 under the text of media-layer 002. If another user with a client machine 137 or 138 accesses this same session, then the same steps will repeat, thus assuring that both client machines 137 and 138 are displaying the same thing.

Interacting with media objects in a synchronized mode is discussed next. The stage manager tool 1104a of the system 110b insures that all changes in state of a media-layer or actions that are passed to the media-layer from that media-layer's contents, is communicated to the host server 102c to either be recorded, or sent to some or all of the other client machines 137 and 138. This is accomplished by the host server 102c maintaining a list of all subscribed client machines 137 to 139. As an event is received from a client machine 139, that event is logged and stored either on the host server 102c and/or on the database 104b. This event is then passed to the rest of the client machines 137, 138 on the subscriber list. The event is then replicated on all client machines 137, 138, however, in rare cases, an exception rule can intercept the event and then follow a defined action which may or may not mimic the original event. For example, a client machine 137 may click on an object in a media-layer 002 thus making that object interactive. The client 137 then moves the object 002 from one location to another, thus creating an event. The changed media-layer attribute 149 information, in this case Position X, Position Y, Date last modified, to the host server 102c as an event. The host server 102c records this new information and then sends this event information to all subscribed client machines 137 to 139. Users on the client machines 137 to 139 would then see the same object from the original location to the new location as indicated by the terms of the event.

Figure 2A:
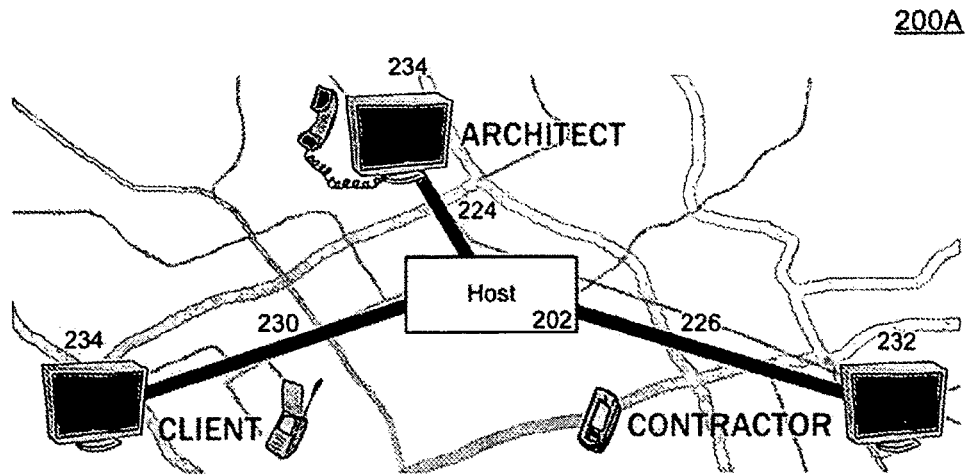
FIG. 2A illustrates an example of collaborative actions in a web conferencing environment in accordance with an embodiment of the invention.

FIG. 2A illustrates an example of collaborative actions in a web conferencing environment 200A. Users 230 Client, 232 Contractor and 234 Architect hold a teleconference in separate geographical locations. A virtual shared space is created when users 230 to 234 are logged into a common session through synchronous communication links 224 to 228 with host server 202.

Figure 2B:
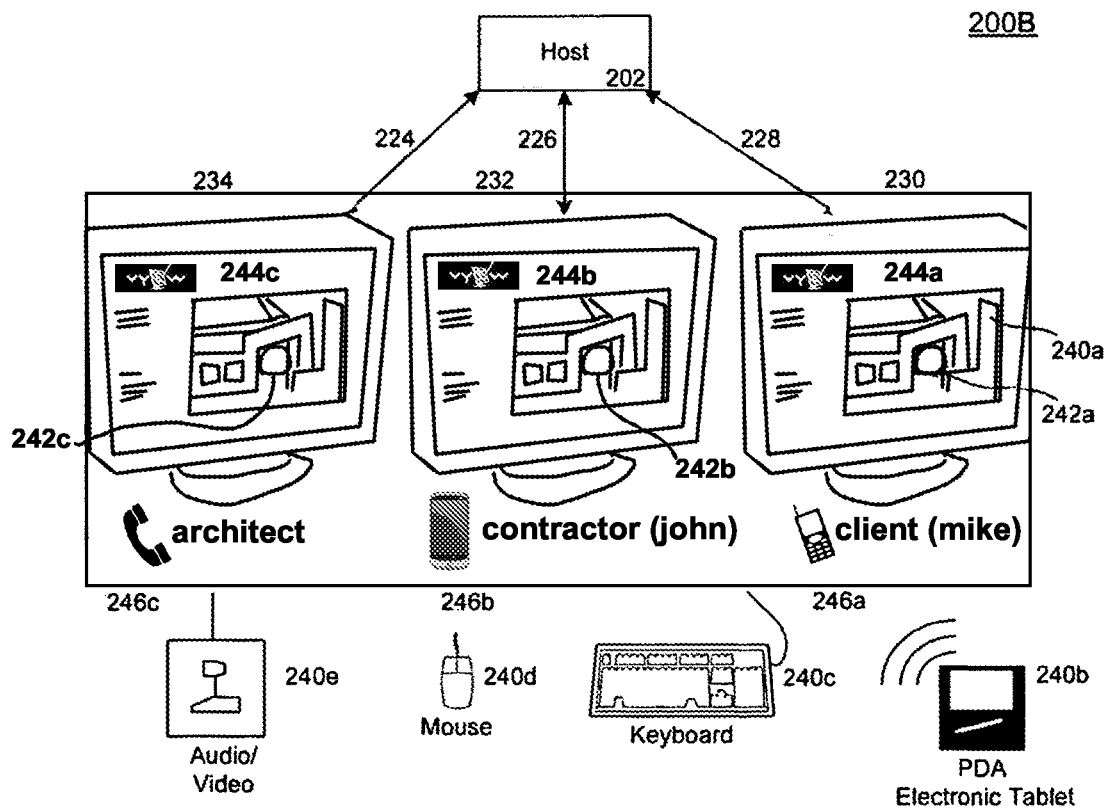
FIG. 2B illustrates an example of synchronizing an annotation of a drawing in a shared space through various input devices in accordance with an embodiment of the invention.

FIG. 2B illustrates an example of synchronizing an annotation of a drawing in a shared virtual space 244a to 244c through various input devices 240a to 240e during a web conferencing environment 200B. In an embodiment, the shared space 244a to 244c is a web-based shared environment such as a web browser where multiple users 230 to 234 can create, transform and delete a wide variety of media as well as annotate over or under said media. The example in FIG. 2B illustrates that user 230 as client Mike annotating a circle 242a over an image of a floor plan displayed on the computer monitor using an electronic or optical pen 240a. This action is synchronized and displayed on those sharing the same virtual space 244b as 244c in user 232 contractor John and user 234 Architect's computer monitors. All actions from any of the users 230 to 234 are also stored on the server 202 for later retrieval. If users 230 to 234 annotate the floor plan drawing at same location at the same time, the last input to the shared space 244a to 244c will be recorded and shown on the computer monitors.

Alternately, other input devices such as but not limited to a wireless PDA or electronic tablet 240a, a keyboard 240c, a mouse 240d, optical pointer, USB flash memory, stylus, audio or video equipment 240e such as a video camera or microphone or both can also be sent as inputs to the shared space 244a to 244c. The cellular phones 246a to 246c voice input can be integrated as a media layer over the other text or graphic layers during the teleconferencing.

The shared environment is multi dimensional thus allowing users 230 to 234 to sort information by not only content, but spatial, temporal and inter relationships between the media-layers created. Because the shared space 244a to 244c is virtual and not restricted to one image, more then one media can be placed within the same shared space 244a to 244c.

FIG. 3A to 3E are various browser screenshots 300A to 300F of a Graphical User Interface (GUI) illustrating a plurality of executable tool functions including the stage manager tools available for the collaborative media-layered platform. In an embodiment, the GUI shown in FIG. 3A includes standard windows editing tools 304a. The shared media workspace 310 acts as a container to support a plurality of media file formats and plug-in applications where layer-based authoring content can be easily moved, scaled, copied, pasted, layered and deleted. On-demand access to different content or sessions—saved and organized by topic, audience or version for example. A user list 306 and chat configurations 308 are also shown. Some examples include the Microsoft Office.®. and Adobe.®. PDF files, real time desktop sharing, photos, etc. shared media workspace 310 can import and export (to PowerPoint or PDF) for asynchronous work or archiving offline. Operation and UI of the client application in an offline mode is similar. This characteristic allows the user to continue annotating the media layer objects when offline (temporarily leaving the session), re-synching to the latest changes on the media layer or to the session when back online. The time and space synchronization of content changes and annotations enable users to publish content anywhere on the web, have presence awareness capabilities to know when other users are interacting with that content, and then interact with that user in real-time.

Figure 3A:
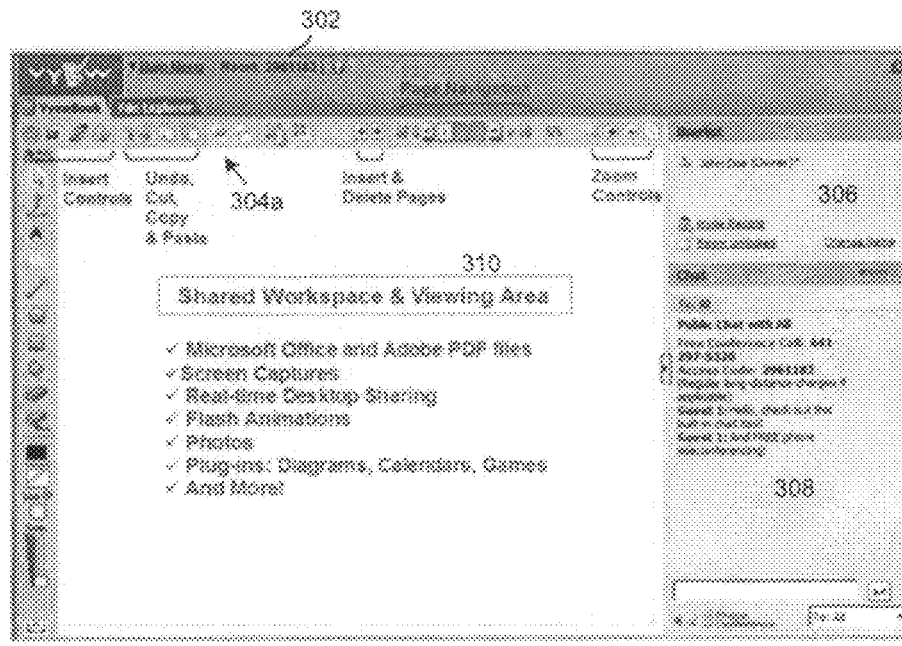
FIG. 3A to 3F depicts various functions and features of the invention in creating a collaborative multimedia platform in accordance with an embodiment of the invention.
Figure 3B:
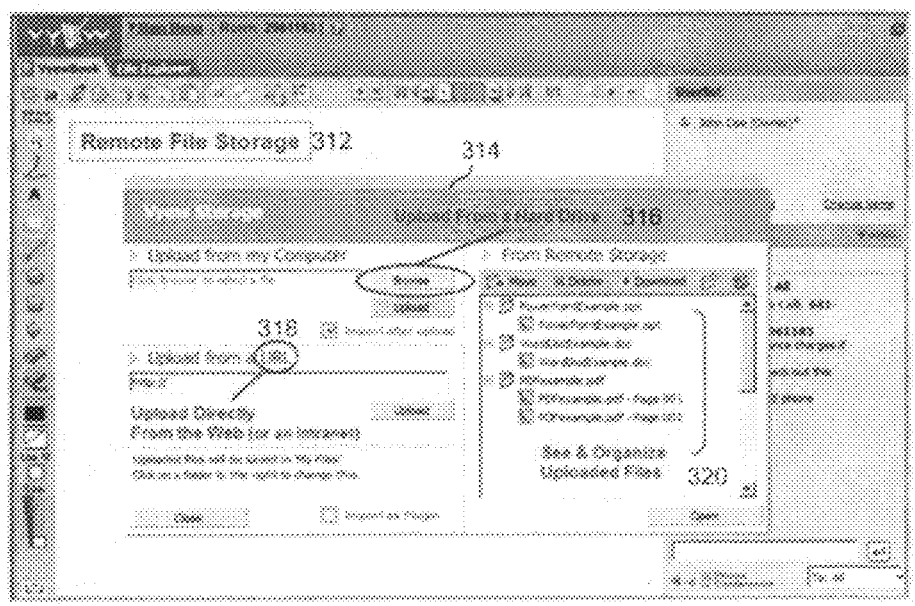
Figure 3C:
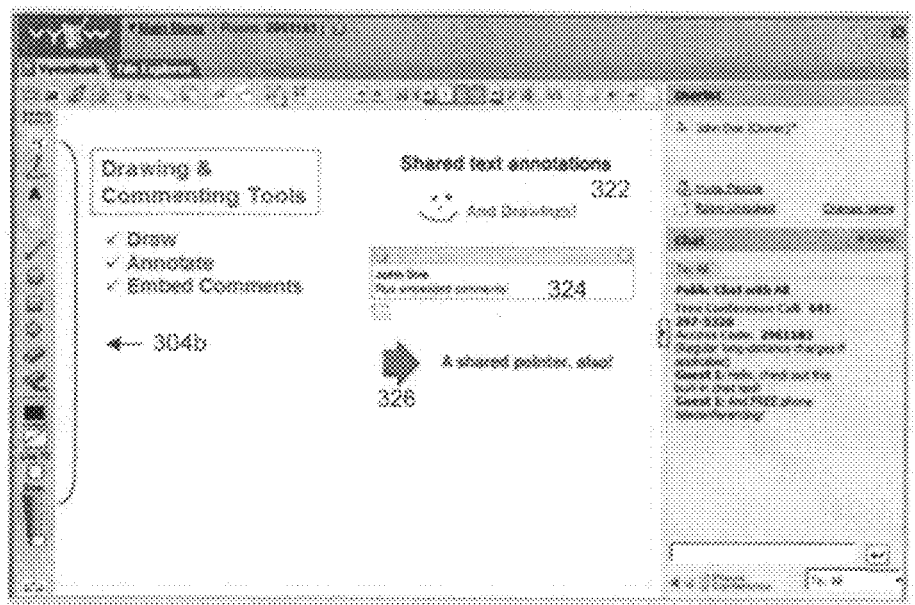
Figure 3D:
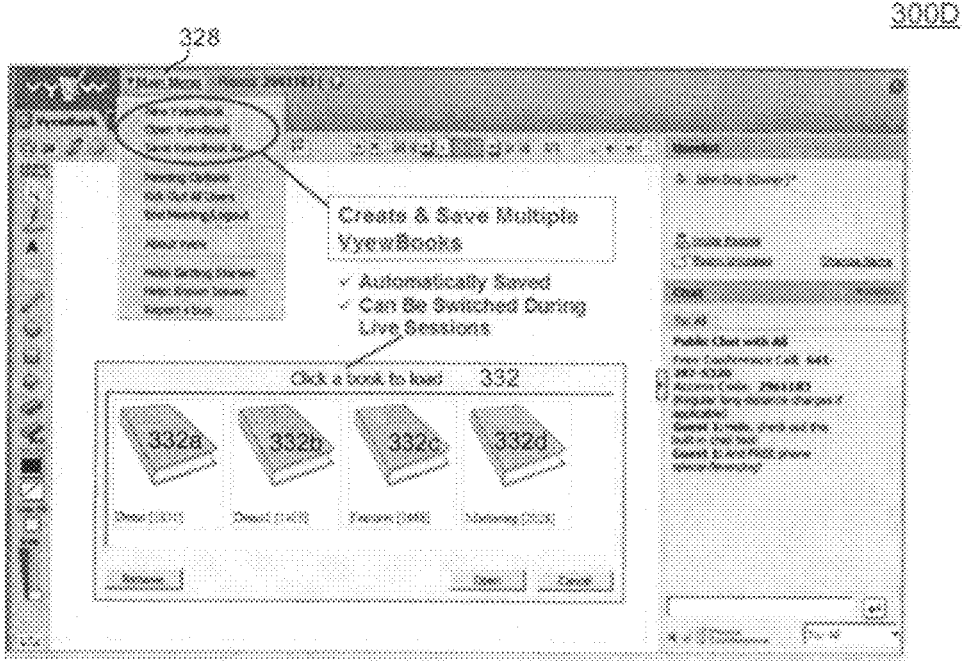

FIG. 3B illustrates another window opened from the tool bar where the upload of files from a file storage remotely 318 or locally from a hard drive 316. For remote locations, files can be uploaded directly by providing a valid URL. A tree structure 320 shows the organization of the files through a web service 106a from a remote file storage 108a such as one shown in FIG. 1C1 or from the local hard drive 316 or other storage devices accessible from a client machine. In FIG. 3C, new media 322 and text 324 can be created as new media-layers using the tools 304b. 326 shows a shared pointer object that maintains its position across all clients in real-time functioning as a surrogate mouse pointer. FIG. 3D illustrates GUI tools invoked to support the book typical metaphor. Using the main menu 328 to open, create or save a collection, illustrated here as a 'book' to be shared and viewed by the users in the session. Books 332a to 332d can be switched during a session by the users.

Figure 3E:
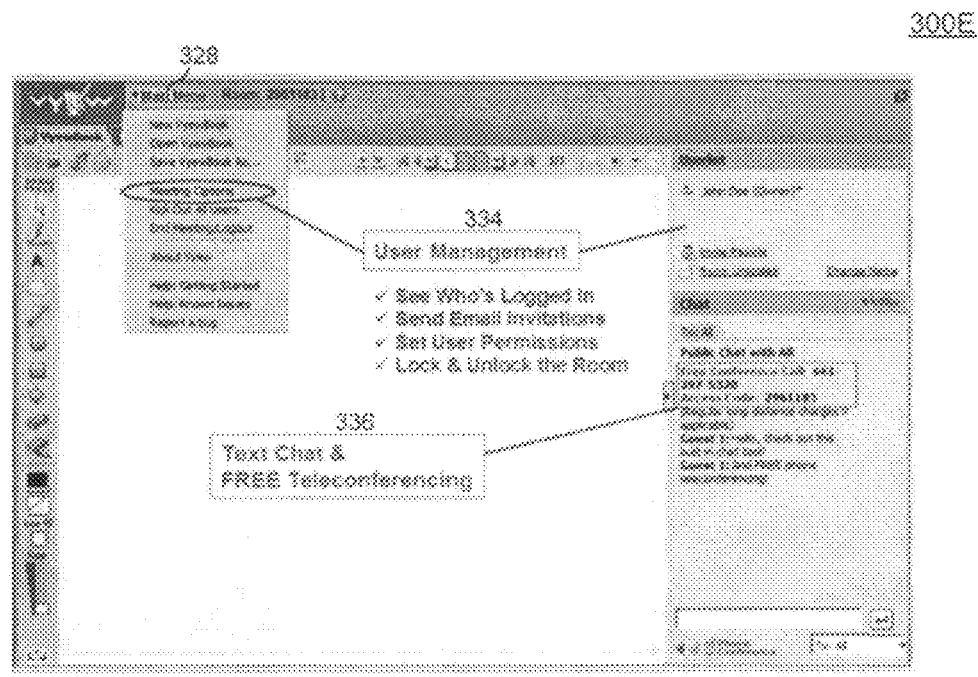
Figure 3F:
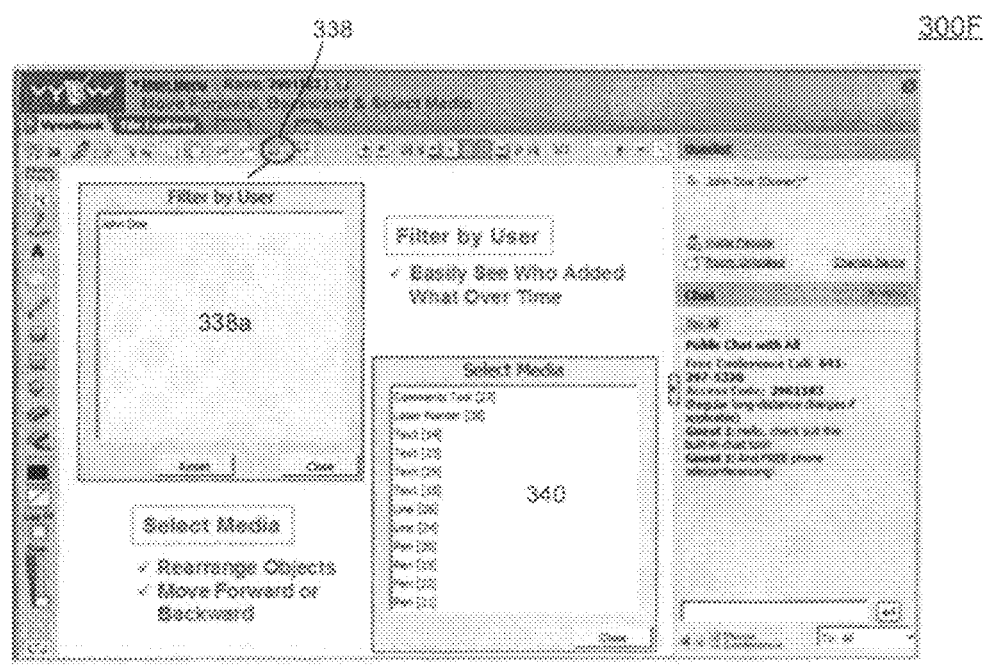

FIG. 3E illustrates the user management 334 function can be invoked by selecting meeting option from the main menu tool bar 328. The user management function allows user see who is logged in, send email invitations, set user permissions, lock and unlock the room for the shared session. The option of using teleconferencing 336 by using online VOIP (Voice Over IP), cell or common POTS while interacting in real time with users during the session can be done by providing an VOIP client or phone number and access code for those users given permission to access said voice service. FIG. 3F illustrates a 'filter by user' tool 338 where a window 338a is opened to display the ID labels (name) of all users that have created a media-layer on the current page. Objects can be hidden or unhidden based on the selection of one or more names. This same filtering is also achieved based on the time from of when media-layers were created and/or modified. Another select media window 340 allows the selection of media-layers based on the media-layer's ID label.

Figure 4:
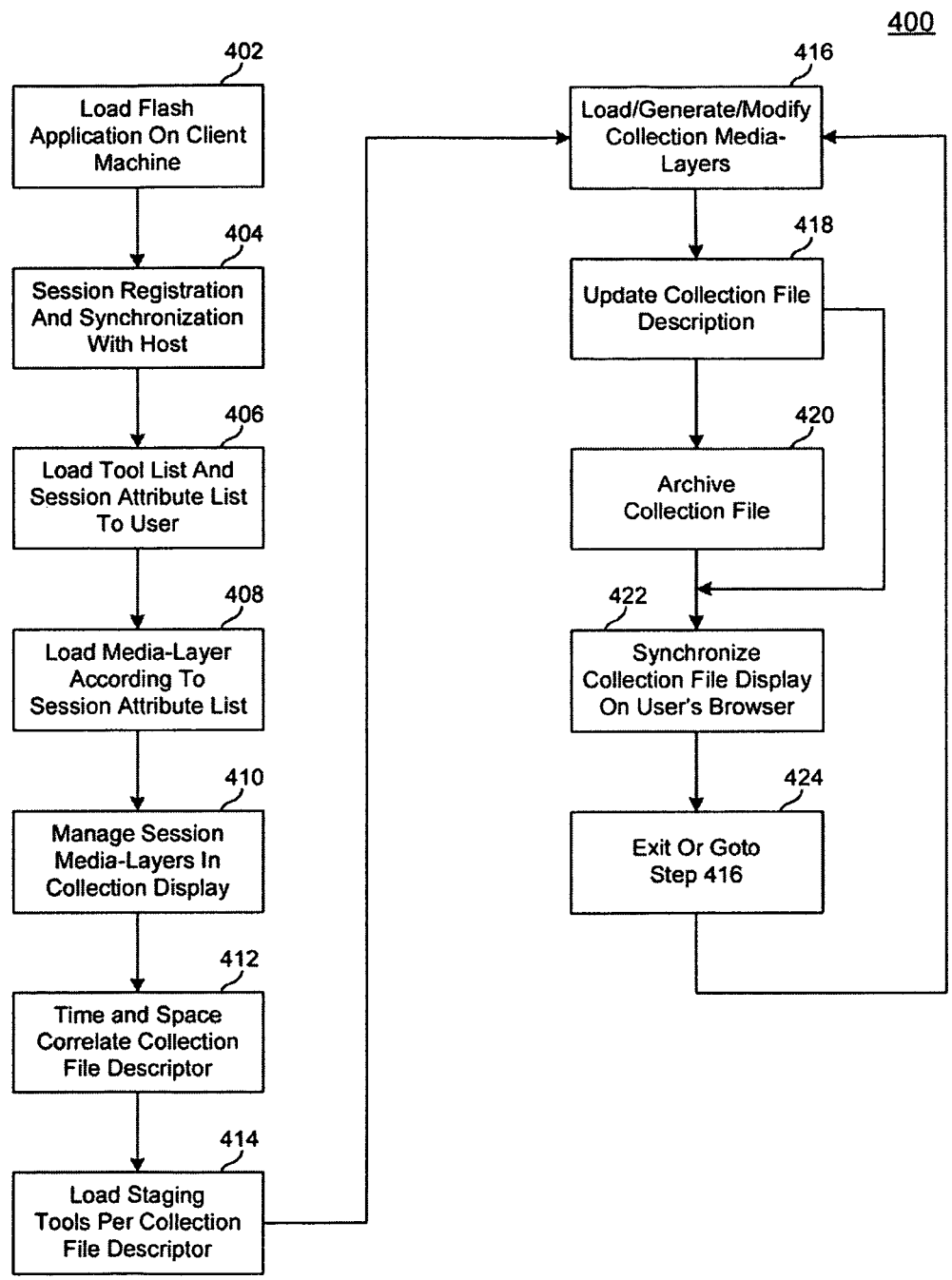
FIG. 4 is a flow chart depicting a method to collaborate a web browser based media-layered session in a network environment in accordance with an embodiment of the invention.

FIG. 4 is a flow chart 400 depicting a method to collaborate a web browser based media-layered session between two or more users in a shared environment. In an embodiment, the shared environment is an Ethernet WAN or LAN network, a fiber optic communication direct link, a Flash application is loaded on each registered client machine in step 402. In step 404 the flash application on the client machine connect to a host server after being authenticated. The host registers the users and opens a session to support synchronous communication. In step 406, the host retrieves from a database the identity of user and sends a tool list to be loaded by the flash application on the client. In step 408, the flash application will load one or more media-layers in response to the receipt of a session attribute list from the host. If no specific attribute is specified, a default media-layer is loaded. One of such tools is the stage manager tool. In step 410 a plurality of media-layers form a collection; where the collection is managed by the stage manager tool, only the active layers are viewable by users, the inactive layers are hidden from view. In step 412, the collection is correlated with information including time last modified and 3D space coordinates into a file descriptor suitable for network equipment communication such as an XML file. In step 414, the user web browser loads staging tools from the stage manager according to the user's collection file descriptor received. The collection file descriptor can be a file from a remote file storage location or from the user's local hard drive. If no particular format is specified, the staging tool will load one or more default media-layers for the session. In step 416, the user can load an existing file with a collection of media-layers from a remote location on the web by specifying URL address or from a local hard drive. The user can also generate new or modify the loaded media-layers. In step 418, the modifications are user's inputs include annotation, delete, insert, copying, pasting or drawing to the media-layers. The updated collection file descriptor can be stored for later retrieval by the users in step 420, or can be accessed by other users logged in the same session in step 422. In step 424, if all tools and media-layers loads are completed, the process ends until further inputs from any of the users in the session.

Figure 5:
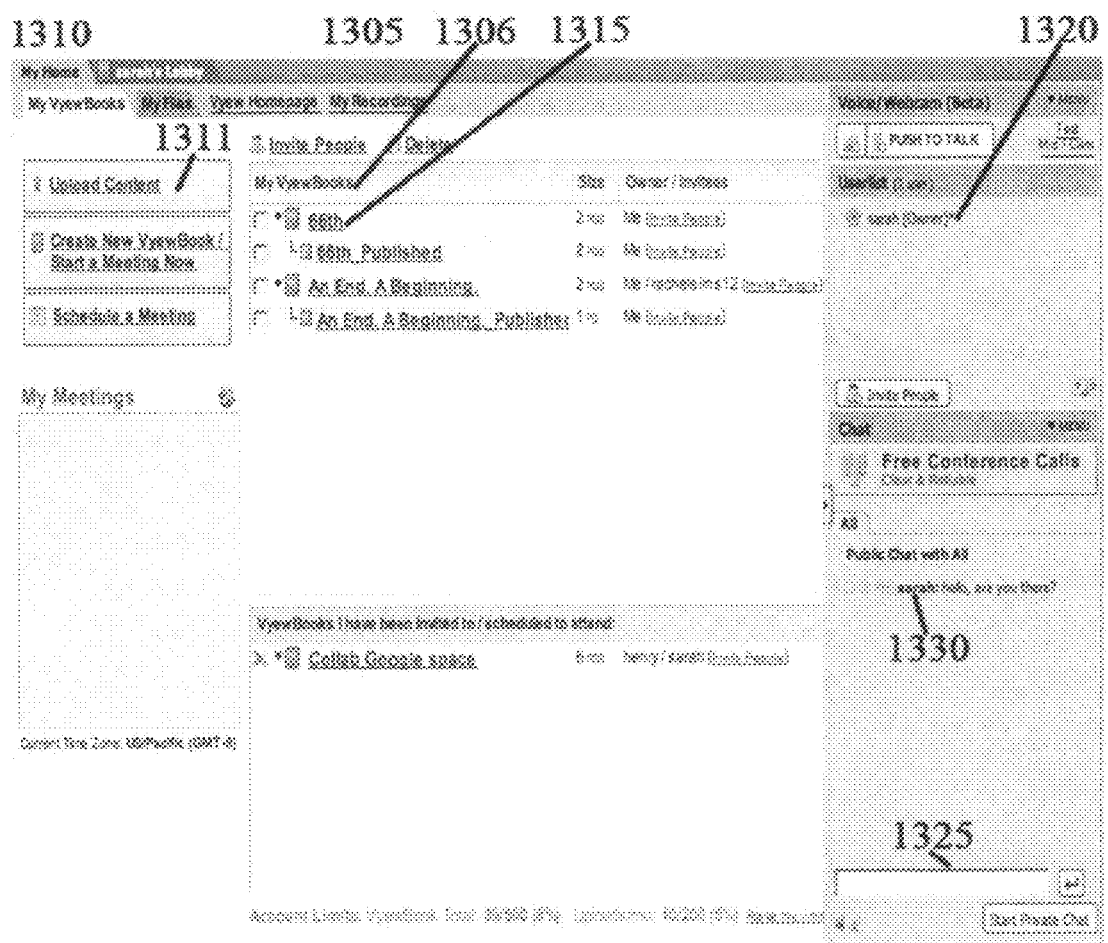
FIG. 5 depicts a browser with various functions and features of the invention for creating a collaborative multimedia platform in accordance with an embodiment of the invention.

In one embodiment of the invention multimedia content serves as the centerpiece for a dialogue among users. FIG. 5 illustrates a browser 1305 image as provided for by loading a media application such as 110*a* to 110*c* as designated in FIG. 1A which as earlier described generates by the interaction of the codes in the user machines 130 to 134 and the codes from the host server 180, with a plurality of tools into a one or more user machines such as allowing the logging in one or more user machines to a shared space in the network. The media application of the present invention further comprises means to up load graphic depictions in a form of digital content presented in the form of one of a document, waveform, or multidimensional graphic.

Each user such as an owner 1320 by way of example Jones will have a designated home 1310 defining its space containing multimedia residing in a database files 1306 referred to a My Vyewbooks containing one or more specific files or books with by way of example names such as "Einstein monrow" book 1315. A user may engage in a public chat 1330 as earlier described by typing a comment in dialogue window 1325. The user may access a file, also referred to as a book, such as "Einstein monrow" book 1315. If there is no content or different content is desired it can be uploaded 1311. Other features may be included such as creating a new book, scheduling a meeting, listing meetings, etc.

Figure 6:
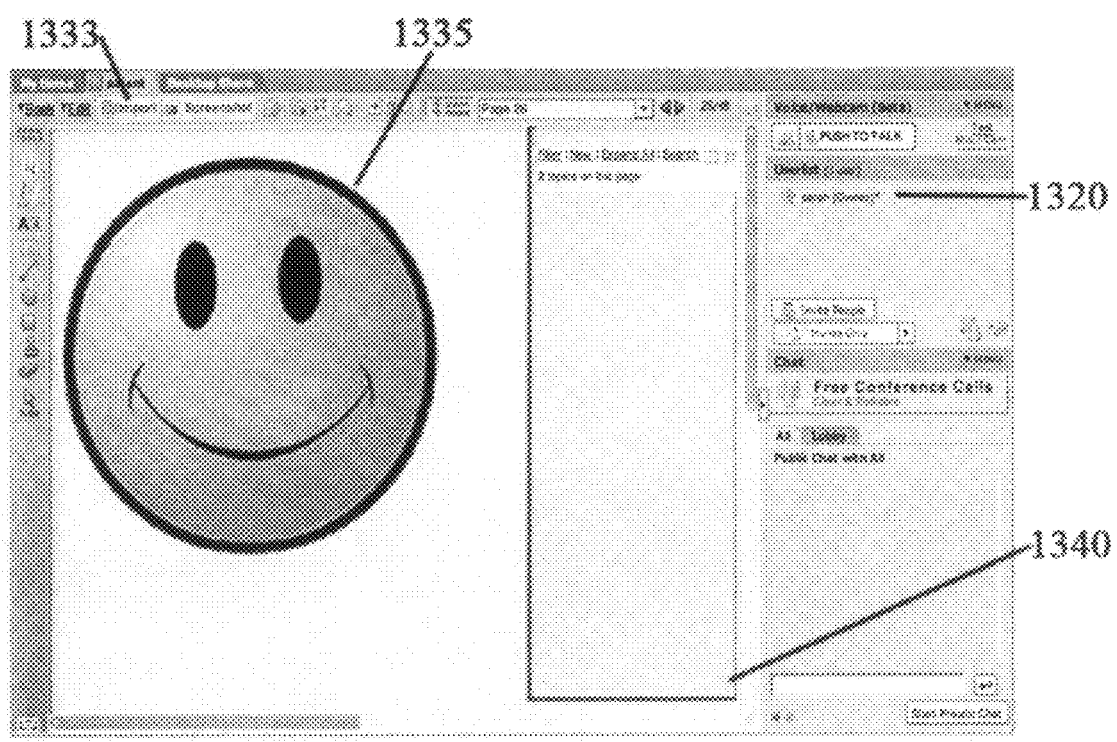
FIG. 6 depicts a browser with various functions and features of the invention in creating a collaborative multimedia platform in accordance with an embodiment of the invention.

The users in a particular session may have access to a certain documents or images that by way of illustration are displayed on a whiteboard within their browsers. FIG. 6 illustrates a typical space having an image 1335 such as book 1315 entitled "Einstein monrow". In the event additional or different content is desired a user can import 1333. Depending on various permissions allocated by the owner 1320 of the image, it is generally accessible by all users invited to a conference. Each user can then render comments concerning the image 1335 using an anchored side bar 1340. The side bar 1340 typically is placed along side the image 1335 to which it pertains.

Figure 7:
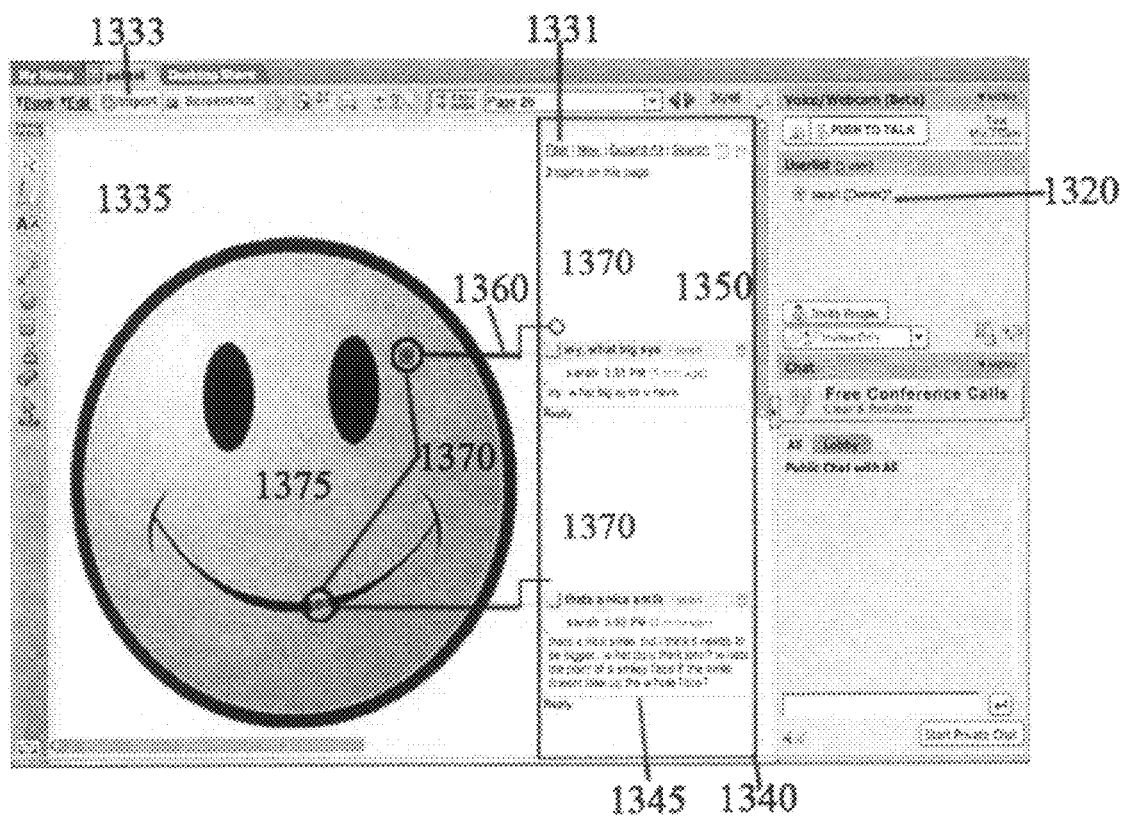
FIG. 7 depicts a browser with various functions and features of the invention in creating a collaborative multimedia platform in accordance with an embodiment of the invention.

In FIG. 7 the image 1335 is displayed in the browser on a whiteboard that allows alterations to the images and the ability to draw attention to features of the image. Each user is also able to provide a message comment 1345 in the anchored sidebar panel 1340 related to among other things the image, image features or discussions related or unrelated to the image. A message comment also allows replies to be created forming message threads. After submitting the message comment an icon 1370 appears next to the comment 1345, which can be moved or dragged by a mouse to a point of interest such as point 1375 in the document of image 1335. A persistent line 1360 is then drawn between the message comment 1345 to the point 1375 having at its terminus the new location of the icon 1370. The message comment may be collapsed into a preview pane view or title pane view format common among message web browsers. Thereafter, clicking on icon 1350 will open the message and the subsequent related messages that together form associated threads. Alternatively clicking on the icon 1370 at the point of interest 1375 will also display the message associated with the icon at the point of interest 1375. Using icon 1331 a message may be filtered to display one or more messages according to one of author of message, message content, date or time. In one embodiment filtering allows users within the shared space to filter user inputs such as media-layers, user comments, notes, and drawings. In yet another embodiment filtering by a user would temporarily hide all other media-layer content except for the selected user. The invention further also relates to a method of producing a write up on a log or a page illustrating a summary of all inputs into the user space. The invention further relates to a method for tracking of all user inputs for the purpose of producing the log of all logins, inputs and interactions by all users within the shared space. Software means that provide for filtering and tracking are well know to those of ordinary skill in the art of computer programming for web browser applications and associating database content containing the pertinent information.

Figure 8:
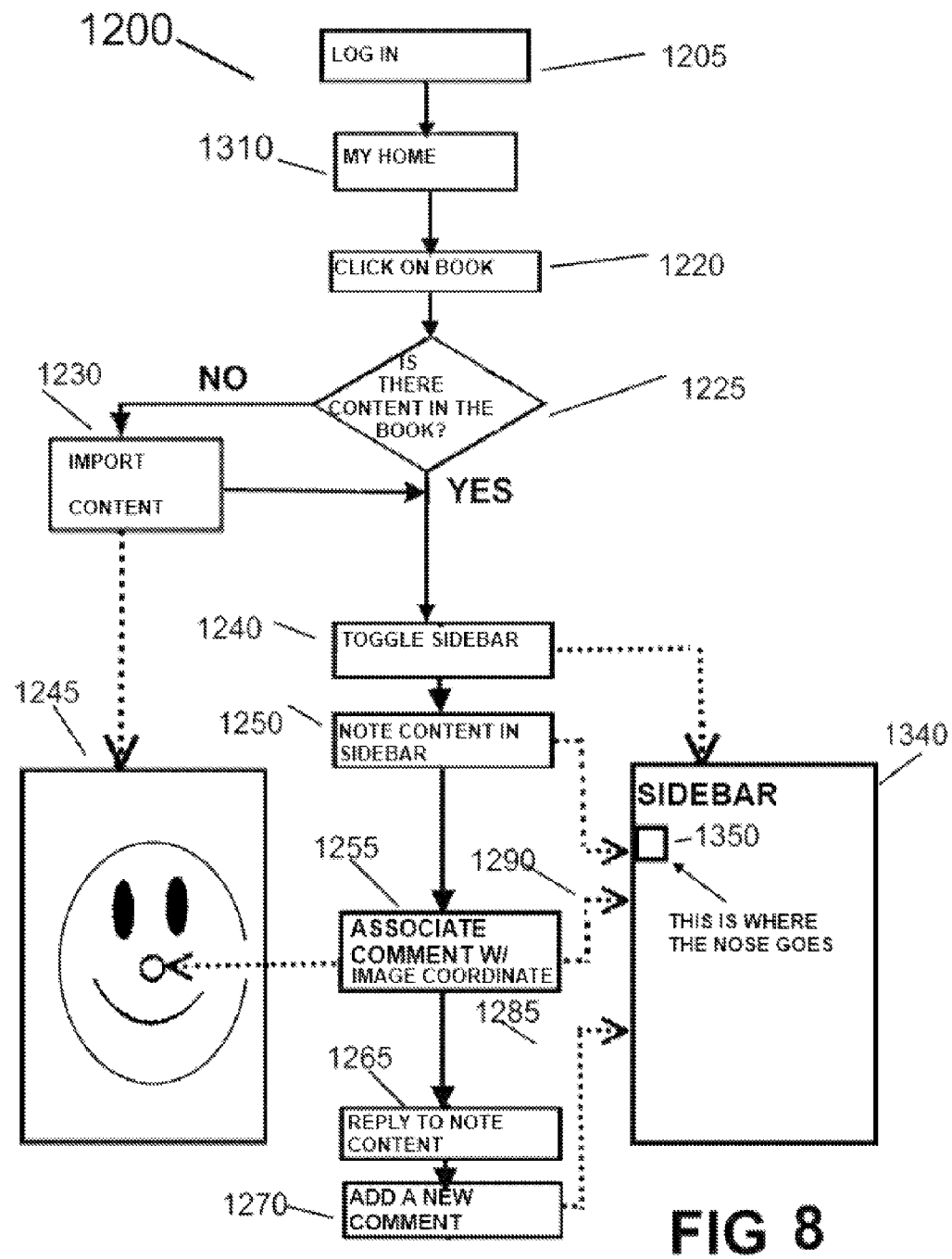
FIG. 8 is a flow chart depicting a method to collaborate using a web browser based media-layered session in a network environment in accordance with an embodiment of the invention.

FIG. 8 in conjunction with FIG. 5 through FIG. 7 illustrates one embodiment of the present invention that includes a method 1200 to collaborate and interact with multimedia tasks while in a shared space within a network as described in connection with FIG. 1A through FIG. 4. The method 1200 includes the steps of loading a media application such as 110*a* to 110*c* as designated FIG. 1A generated by the interaction of the codes in the user machines 130 to 134 and the codes from the host server 180, with a plurality of tools into a one or more user machines such as allowing the logging in 1205 in from the one or more user machines to a shared space the network from the user application to a host. Each user will have the designated home 1310 defining its space containing multimedia residing in a file with by way of example file name book 1315. A user accesses the book 1315 by clicking 1220 a mouse and when the browser appears determines 1225 whether the desired image is on the screen or another image should be imported as in FIG. 7, 1333. If new content is desired then using import icon 1333 a user imports content 1230 such as image 1245. If multimedia content of interest exists in the book then the user has several options. One such option is to display the sidebar 1340 by toggling 1240 an icon that provides for that purpose. Utilizing a hot key or mouse for clicking or toggling is well know to those of ordinary skill in the art of computer programming for web browser applications. If the sidebar 1340 contains a comment of interest then the user can note its interest 1250 by clicking on message icon 1350 that associates 1255 the point 1375 of interest highlighted on the media 1245 by the icon 1370 and/or the owner can lock down the point of interest. A user may also reply 1265 to the comment adding 1270 a new comment that is then posted 1285 to the sidebar 1340 forming a message thread. In each case a user may move icon 1370 to highlight of one or more points 1375 on the media 1245 in accordance with the intentions of a user of the method. Means for moving icons on a graphical image situated in a browser are well know to those of ordinary skill in the art of computer programming for browser applications.

Figure 9:
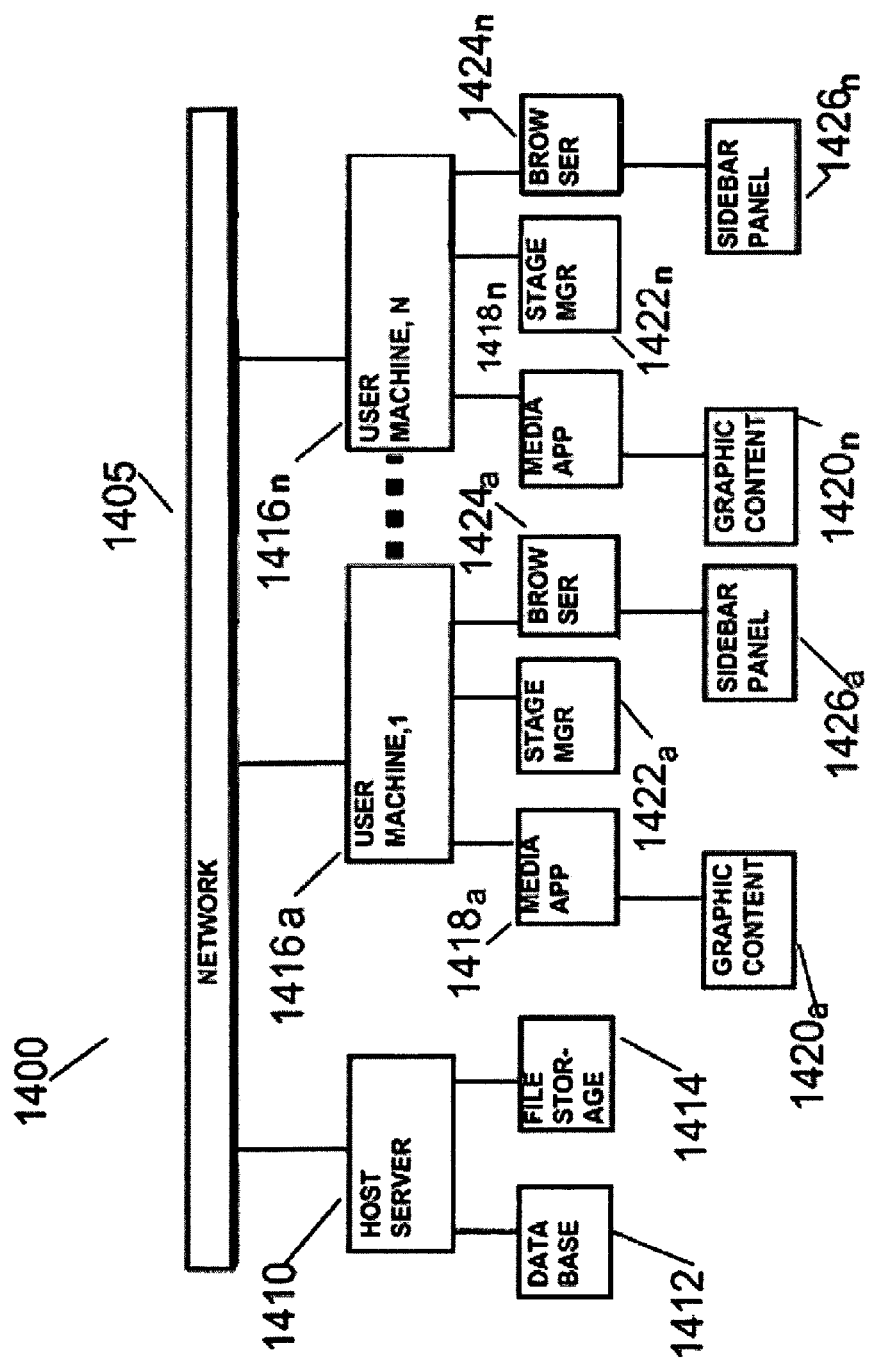
FIG. 9 is a system to collaborate using a web browser based media-layered session in a network environment in accordance with an embodiment of the invention.

In yet another embodiment of the present invention FIG. 9 illustrates a system 1400 to collaborate and perform multimedia task inputs in a shared space within a network as described in connection with FIG. 1A through FIG. 1G, and FIG. 5 through FIG. 8 including: a host server 1410 for communicating with database 1412 and file storage 1414 through network 1405; one or more user machines 1416*a* through 1416*n* with associated user applications for logging onto the host server to join a shared space session with other user machines running user applications; and wherein the shared space session is generated by interaction of executable codes in the host 1410 and the user applications and the shared space session described by a session attribute list; a media application with a plurality of tools loaded into the user machines; at least one user provided graphical content 1420*a*, 1420*n* installed into media-layers 1418*a*, 1418*n*; and a stage manager 1422*a*, 1422*n* to facilitate the display of media-layer updates to other users in the shared space in one of a synchronous or asynchronous mode that includes one or more user messages contained in a sidebar panel 1426*a*, 1426*n* anchored to a region of web browser 1424*a*, 1424*n* as described in connection with FIG. 5 through FIG. 8, of a user machine, whereby at least a portion of the message relates to graphical content displayed on a whiteboard within the browser 1424*a*, 1424*n*, and whereby points of interest within the graphical content are highlighted and associated to said message by one or more persistent lines. The system 1400 of the present invention further includes means as illustrated in FIG. 8 for moving highlighted of one or more points 1375 of interest of interest to highlight the media 1245 by the icon 1370. The system 1400 of the present invention further includes the means to create one or more message threads based upon a message existing in the sidebar panel 1426*a*, 1426*n*. The one or more messages contained in a sidebar panel 1426*a*, 1426*n* are further anchored to a region of a browser as described in FIG. 5 Through FIG. 8.

Figure 10:
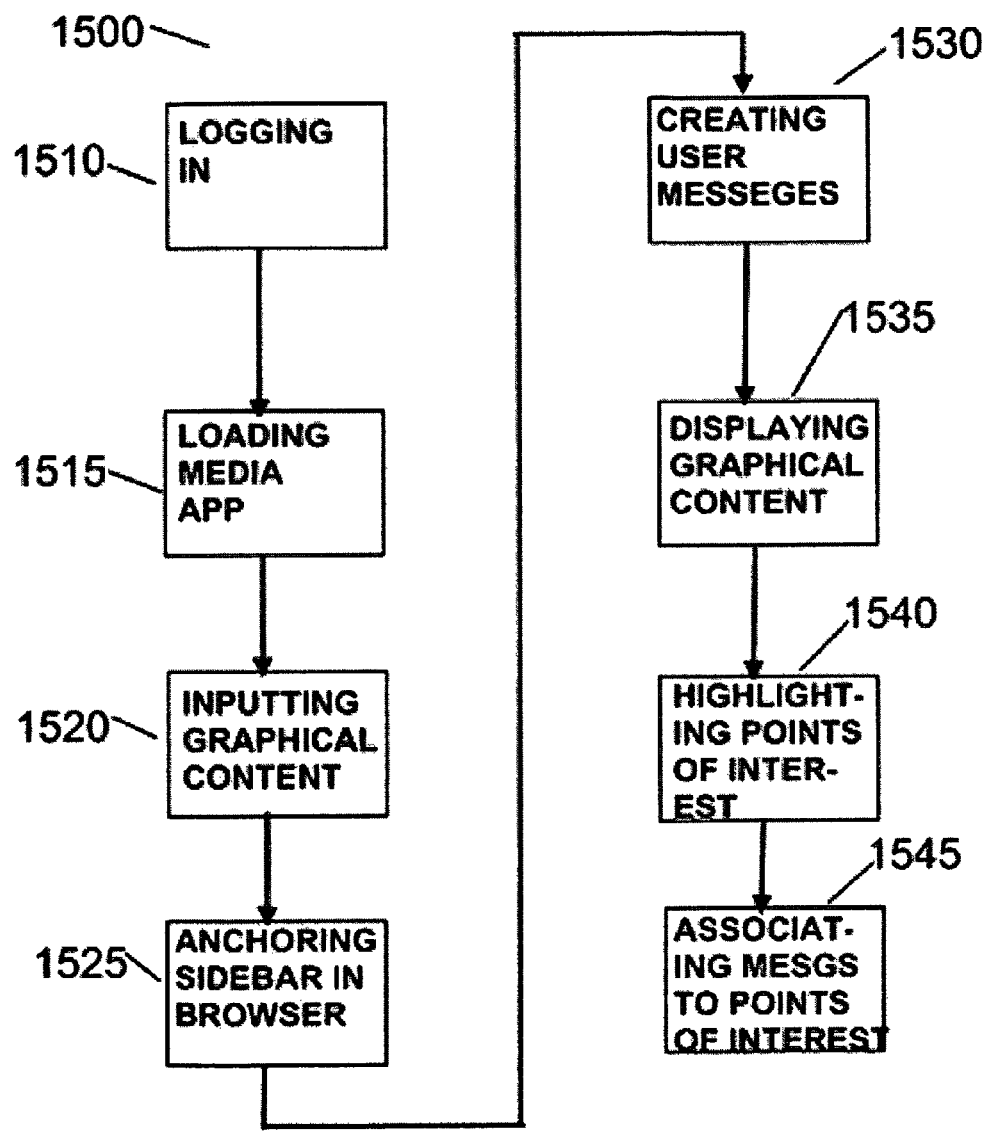
FIG. 10 is a flow chart depicting a method to collaborate using a web browser based media-layered session in a network environment in accordance with an embodiment of the invention.

In yet another embodiment of the present invention FIG. 10 illustrates a method 1500 to collaborate and perform multimedia task inputs in a shared space within a network as described in connection with FIG. 1A through FIG. 1G, and FIG. 5 through FIG. 9 having a host server 1410 for communicating with database 1412 and file storage 1414 through network 1405. The method 1500 to collaborate and interact multimedia tasks in a shared space within the network includes the steps of: logging in 1510 from the one or more user machines to a shared space in a network from a user application to a host, wherein the shared space is created by interaction of executable codes in the host and the user application and the shared space is described by a session attribute list; loading a media application 1515 with a plurality of tools into one or more user machines; inputting graphical content 1520; and displaying the graphical content by other user machines in the shared space in one of a synchronous or asynchronous mode including anchoring a sidebar panel 1525 to a region of a web browser; creating one or more user messages 1530 in the sidebar panel; displaying graphical content 1535 on a whiteboard within the browser; highlighting points of interest 1540 within the graphical content and associating said user messages 1545 to the points of interest by one or more persistent lines. The method also includes synchronous or asynchronous message exchange occurring in a chat room. A user may also filter one or more messages according to one of author of message, message content, date or time. The method 1500 highlighting points of interest 1540 and associating said user messages 1545 includes placement of an icon on the point of interest that links to the message. The icon designating a point of interest within the graphical content will open the message and the subsequent related messages that in together form a thread.

While the foregoing invention has been described with reference to the above embodiments, additional modifications and changes can be made without departing from the spirit of the invention. Accordingly, such modifications and changes are considered to be within the scope of the appended claims.

We claim:

1. A method to collaborate, interact with and perform multimedia tasks in a shared space within a network comprising the steps of:
   A. logging in from one or more user machines to a shared space in a network from a user application to a host, wherein the shared space is created by interaction of executable codes in the host and the user application and the shared space is described by a session attribute list:
      a. said logging in step further including: registering the user in a shared virtual environment based on user's credentials and other supplied parameters;
      b. administrating the shared space by selecting the subset of tools available to an administrator and to one or more guests;
      c. maintaining a log of the actions and the resulting status of media-layers and their media for all users who are logged into the same session;
      d. allowing users see who is logged in, send email invitations, set user permissions, lock and unlock the room for the shared session;
   B. loading a media application with a plurality of tools into one or more user machines;
      inputting graphical content; and
   C. displaying the graphical content by other user machines in the shared space in one of a synchronous or asynchronous mode including anchoring a sidebar panel to a region of a web browser;
   D. creating one or more user messages in the sidebar panel;
   E. displaying graphical content in the form of one of a document, waveform, or multidimensional graphic on a whiteboard within the browser;
   F. highlighting points of interest within the graphical content; and
   G. associating said user messages to the points of interest by one or more persistent lines;
   H. said highlighting in step further including:
      a. placing an icon on the point of interest that links to the user message, wherein said icon designates said point of interest within the graphical content that opens the message and related messages that form a thread;
      b. clicking on message icon that associates the point of interest on the media by the icon to lock down the point of interest;

I. replying optionally by a user to the point of interest by adding a new comment that is posted to the sidebar panel forming a message thread.

2. The method of claim 1, further comprising the steps of: filtering one or more messages according to one of author of message, message content, date, time, media-layers, user comments, notes, and drawings.

3. The method of claim 2, further comprising the steps of: filtering to temporarily hide all media-layer content except for one of the selected user or selected date range.

4. The method of claim 1, further comprising the steps of: producing one of a write up on a log or a page illustrating a summary of all inputs into the space.

5. The method of claim 1, further comprising the steps of: tracking all user inputs for the purpose of producing the log of all logins, inputs and interactions by users within the shared space.

6. The method of claim 1, further comprising the steps of: moving highlighted points of interest within the graphical content in accordance with the intentions of a user.

7. The method of claim 1 further comprising the step of the host communicating to a database to retrieve a user's session attribute list.

8. The method of claim 1, wherein a stage manager tool manages the viewing or hiding of one or more media-layers in the user application.

9. The method of claim 1, wherein the media application is a plug-in for text, voice, video or graphic application.

10. The method of claim 8, wherein the stage manager tool allows a user to sort information by content, spatial, temporal and inter relationships between media-layers.

11. The method of claim 8, wherein the stage manager tool further comprising the step of filtering designated media-layers to restrict viewing by a user.

12. The method of claim 8, wherein the stage manager tool further comprises the step of grouping collections of media-layers into a book metaphor.

13. A system to collaborate, interact with and perform multimedia tasks in a shared space within a network comprising: a host server for communicating with a database and a file storage through a network; one or more user machines with associated user applications for logging onto the host server to join a shared space session with other user machines running user applications, wherein the shared space session is generated by interaction of executable codes in the host and the user applications and the shared space session is described by a session attribute list; a media application with a plurality of tools loaded into the user machines; at least one user provided graphical content installed into the media-layers; and a stage manager to facilitate the display of media-layer updates to other users in the shared space in one of a synchronous or asynchronous mode that includes one or more user messages contained in a sidebar panel anchored to a region of a web browser of a user machine, whereby at least a portion of the message relates to graphical content displayed on a whiteboard within the browser, and whereby points of interest within the graphical content are highlighted and associated to said message by one or more persistent lines; said highlighting further including: placing an icon on the point of interest that links to the user message, wherein said icon designates said point of interest within the graphical content that opens the message and related messages that form a thread; clicking on message icon that associates the point of interest on the media by the icon to lock down the point of interest; and replying optionally by a user to the point of interest by adding a new comment that is posted to the sidebar panel forming a message thread.

14. The system of claim 13, wherein the graphic depicts a form of digital content presented in the form of one of a document, waveform, or multidimensional graphic.

15. The system of claim 13, wherein the one of the synchronous or asynchronous message exchange occurs in a chat room.

16. The system of claim 13 further comprising a web server with a file storage communicating a tool list to the web browser through the network.

17. The system of claim 13, wherein a stage manager tool manages the viewing or hiding of the media-layers in the web browser.

18. The system of claim 13 further comprising a filtering tool to restrict viewing of designated media-layers by other users.

19. A non-transitory computer readable medium, for collaborating, interacting with and performing multimedia tasks in a shared space within a network to be executed on one or more remote computers, comprising code for: logging in from one or more user machines to a shared space in a network from a user application to a host, wherein the shared space is created by interaction of executable codes in the host and the user application and the shared space is described by a session attribute list:
  a. said logging in step further including: registering the user in a shared virtual environment based on user's credentials and other supplied parameters;
  b. administrating the shared space by selecting the subset of tools available to an administrator and to one or more guests;
  c. maintaining a log of the actions and the resulting status of media-layers and their media for all users who are logged into the same session;
  d. allowing users see who is logged in, send email invitations, set user permissions, lock and unlock the room for the shared session;
  B. loading a media application with a plurality of tools into one or more user machines;
  inputting graphical content; and
  C. displaying the graphical content by other user machines in the shared space in one of a synchronous or asynchronous mode including anchoring a sidebar panel to a region of a web browser;
  D. creating one or more user messages in the sidebar panel;
  E. displaying graphical content in the form of one of a document, waveform, or multidimensional graphic on a whiteboard within the browser;
  F. highlighting points of interest within the graphical content; and
  G. associating said user messages to the points of interest by one or more persistent lines;
  H. said highlighting in step further including:
  a. placing an icon on the point of interest that links to the user message, wherein said icon designates said point of interest within the graphical content that opens the message and related messages that form a thread;
  b. clicking on message icon that associates the point of interest on the media by the icon to lock down the point of interest;
  I. replying optionally by a user to the point of interest by adding a new comment that is posted to the sidebar panel forming a message thread.

* * * * *